US008760515B2

(12) United States Patent
Abe et al.

(10) Patent No.: US 8,760,515 B2
(45) Date of Patent: Jun. 24, 2014

(54) IMAGE DISPLAY APPARATUS WITH MAPPING BASED ON PASSENGER DETECTION

(75) Inventors: Koichi Abe, Fukushima (JP); Tsubasa Nomura, Fukushima (JP)

(73) Assignee: Alpine Electronics, Inc., Tokyo (JP)

( * ) Notice: Subject to any disclaimer, the term of this patent is extended or adjusted under 35 U.S.C. 154(b) by 1761 days.

(21) Appl. No.: 11/945,718

(22) Filed: Nov. 27, 2007

(65) Prior Publication Data

US 2008/0143835 A1  Jun. 19, 2008

(30) Foreign Application Priority Data

Dec. 15, 2006 (JP) ................................ 2006-338154

(51) Int. Cl.
*H04N 5/225* (2006.01)
(52) U.S. Cl.
USPC ............................ 348/148; 348/199; 345/427
(58) Field of Classification Search
CPC ......... H04N 5/225; H04N 5/232; H04N 7/18; B60R 1/00; G06T 15/20
USPC ....................................................... 348/148
See application file for complete search history.

(56) References Cited

U.S. PATENT DOCUMENTS

| 6,817,741 | B2 | 11/2004 | Toda et al. |
| 7,139,412 | B2 | 11/2006 | Kato et al. |
| 7,161,616 | B1 | 1/2007 | Okamoto et al. |
| 7,782,374 | B2 | 8/2010 | Suzuki et al. |
| 2004/0036769 | A1* | 2/2004 | Sadahiro ........................ 348/148 |
| 2006/0197761 | A1* | 9/2006 | Suzuki et al. .................. 345/427 |
| 2007/0041659 | A1 | 2/2007 | Nobori et al. |
| 2007/0159531 | A1* | 7/2007 | Anderson ...................... 348/148 |
| 2010/0188508 | A1* | 7/2010 | McMahon et al. ............ 348/148 |

FOREIGN PATENT DOCUMENTS

| JP | P3300334 | 4/2002 |
| JP | 2002-324235 | 11/2002 |
| JP | 2003-40029 | 2/2003 |
| JP | 2006-277738 | 10/2006 |
| WO | WO 2006/087993 A1 | 8/2006 |

* cited by examiner

*Primary Examiner* — Phuoc Nguyen
*Assistant Examiner* — Kishin G Belani
(74) *Attorney, Agent, or Firm* — Brinks Gilson & Lione

(57) ABSTRACT

An image display apparatus combines vehicle-surroundings images photographed by cameras and displays a top view image. The image display apparatus includes image memories for storing images of landscapes ahead of the vehicle, at the left side of the vehicle, at the right side of the vehicle, and behind the vehicle which are photographed by the corresponding cameras, a mapping-table determining unit for determining a mapping table to be used by detecting the number of passengers in back seats, and a mapping unit for reading image data from the image memories by using the mapping table corresponding to the number of passengers and mapping the read image data to a frame memory to display a top view image.

5 Claims, 21 Drawing Sheets

| VEHICLE HEIGHT | MAPPING TABLE TO BE USED |
|---|---|
| $H_0 - H_1$ | $MPT_0$ |
| $H_1 - H_2$ | $MPT_1$ |
| $H_2 - H_3$ | $MPT_2$ |
| $H_3 - H_4$ | $MPT_3$ |

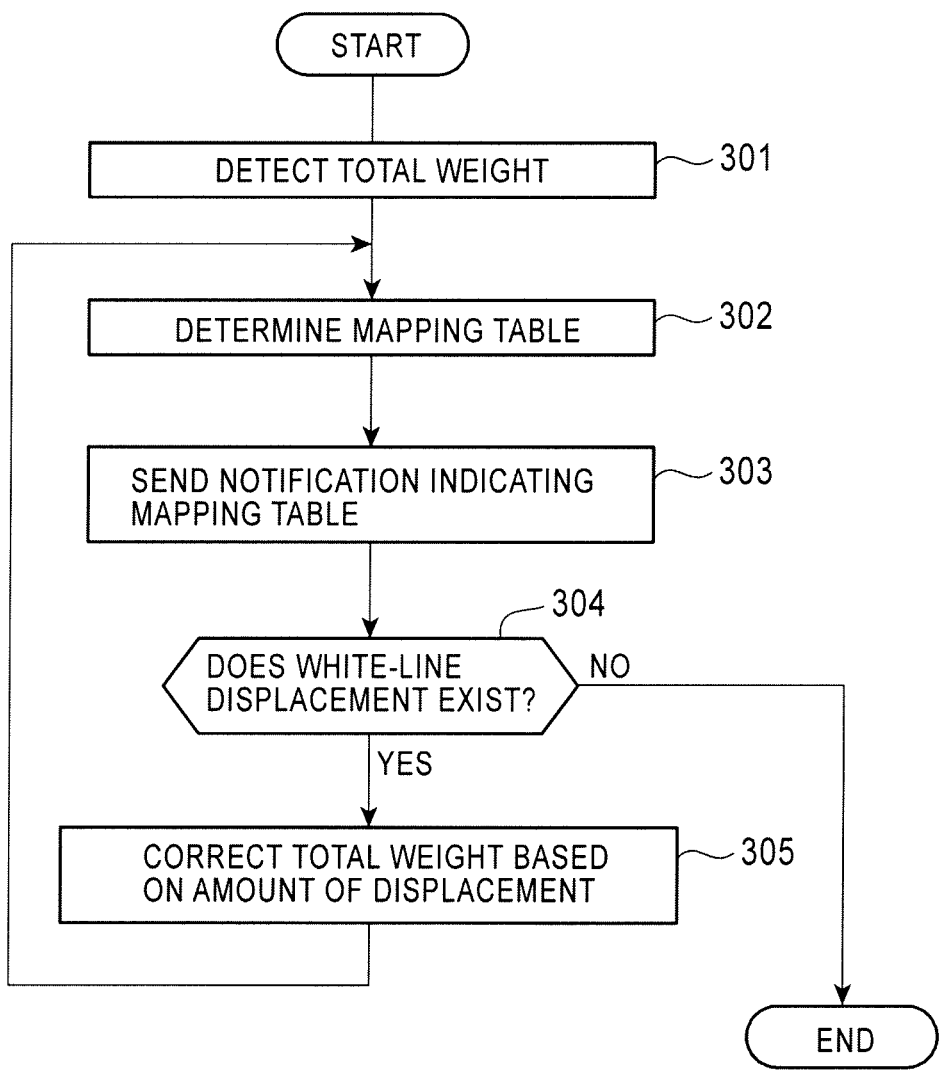

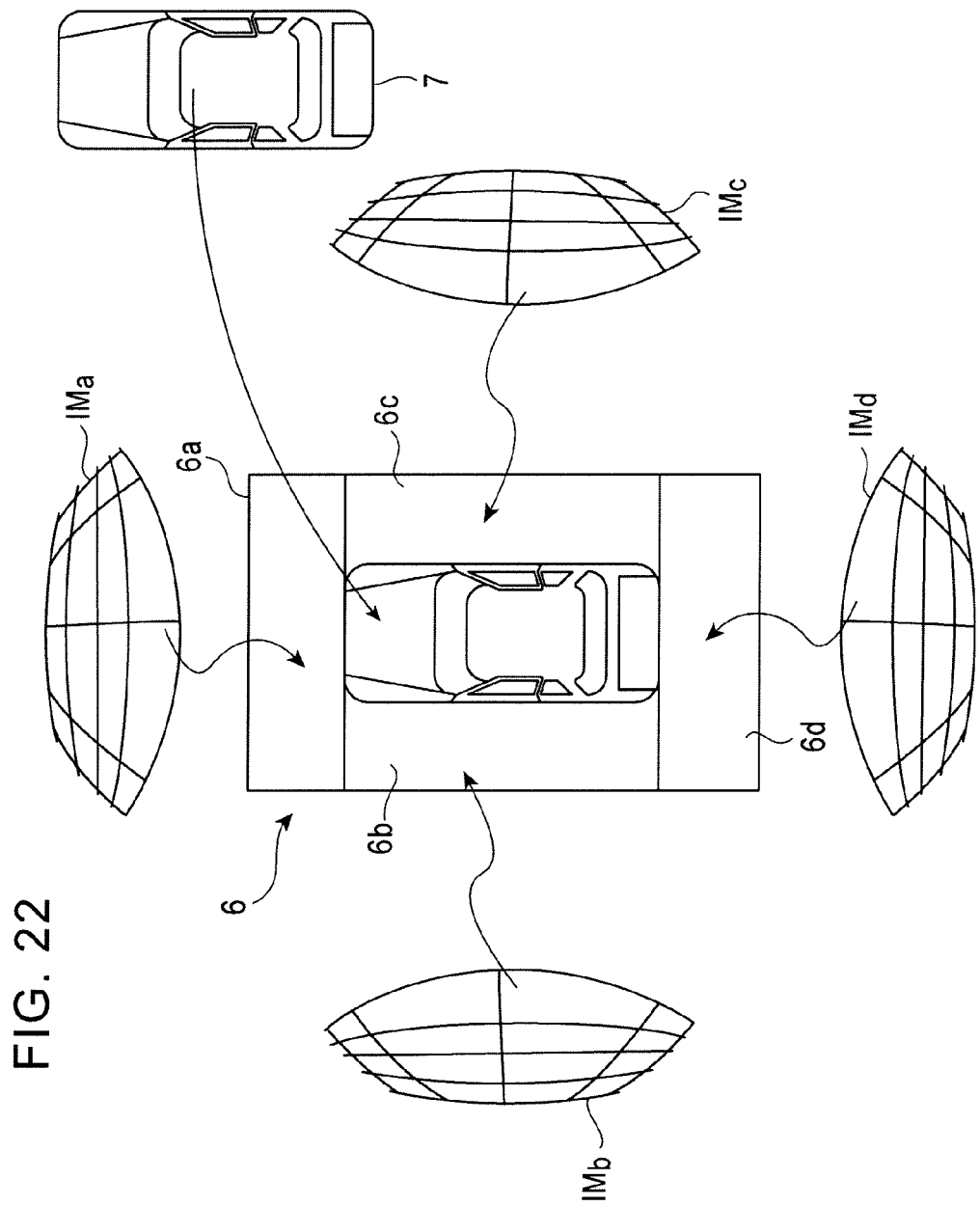

IMAGE DISPLAY APPARATUS WITH MAPPING BASED ON PASSENGER DETECTION

RELATED APPLICATIONS

The present application claims priority to Japanese Patent Application Serial Number 2006-338154, filed on Dec. 15, 2006, the entirety of which is hereby incorporated by reference.

BACKGROUND OF THE INVENTION

1. Field of Invention

The present invention relates to image display apparatuses. In particular, the present invention relates to an image display apparatus that captures surrounding images of a vehicle by using multiple cameras, combines the captured images to draw, in a frame memory, a composite image viewed from a viewpoint above the vehicle, reads image data from the frame memory, and displays the composite image.

2. Description of the Related Art

Systems for assisting drivers in putting vehicles into garages or parking the vehicles are under research and are also in practical use. With such an assisting system, a top-view system is known (refer to Japanese Patent No. 3300334). In the system, surrounding images of a vehicle are captured using multiple cameras, the captured images are combined to draw, in a frame memory, a composite image (a top-view image) viewed from a viewpoint above the vehicle, and image data is read from the frame memory to display the composite image.

In the top-view system, as shown in FIGS. 21A and 21B, fisheye cameras 1a to 1d for photographing the surroundings of a vehicle 2 are attached to a front portion, a left-side portion, a right-side portion, and a rear portion thereof. A composite-image processor 3 uses images captured by the cameras 1a to 1d to create a composite image of a landscape viewed in a predetermined direction from a predetermined position (a virtual viewpoint) 4 above the vehicle 2, as shown in FIG. 21C, and the composite image is displayed on a monitor 5, thereby assisting the driver, for example, in parking the vehicle and putting the vehicle into the garage.

During the combining processing, the composite-image processor 3 uses a mapping table to map image portions photographed by the cameras to a frame memory, and displays the mapped image. FIG. 22 is a diagram illustrating a case in which fisheye graphics $IM_a$ to $IM_d$ photographed by the fisheye cameras 1a to 1d are mapped to a screen frame memory 6. The fisheye graphics $IM_a$ to $IM_d$ are mapped to corresponding areas 6a to 6d in the frame memory 6, and a vehicle image 7 pre-photographed and stored is mapped to a center portion of the frame memory 6. Consequently, a top-view image for one screen is generated in the frame memory 6.

FIG. 23 is a detailed diagram illustrating the mapping method. The fisheye cameras 1a to 1d attached to the vehicle 2 photograph a landscape ahead of the vehicle, a landscape at the left side of the vehicle, a landscape at the right side of the vehicle, and a landscape behind the vehicle, respectively. Using a fisheye lens, each of the cameras 1a to 1d can photograph a landscape in the range of 185° in front of the camera. The camera 1a photographs a landscape ahead of line FF, the camera 1b photographs a vehicle-left-side landscape at the left side of line LL, the camera 1c photographs a vehicle-right-side landscape at the right side of line RR, and the camera 1d photographs a vehicle rear landscape behind line BB.

When a rectangular grid pattern drawn on the ground at the left side of the vehicle 2 is photographed by the camera 1b, as shown in FIG. 23B, a graphics viewed by a fisheye (the graphics is herein referred to as a "fisheye graphics") is obtained as shown in FIG. 23C.

Projecting the fisheye graphics photographed by the cameras 1a to 1d can provide a top-view image. In a rectangular graphics 6 and a fisheye graphics 7, areas denoted by the same reference numerals correspond to each other. That is, areas 1 to 6 in the rectangular graphics 6 correspond to areas 1 to 6 in the fisheye graphics 7. Thus, when images of the areas 1 to 6 in the fisheye graphics 7 which correspond to images of the areas 1 to 6 in the rectangular graphics 6 are stored at frame-memory positions where the images of the areas 1 to 6 in the rectangular graphics are to be stored, and similarly, images photographed by all the cameras are drawn in the frame memory and are read. Thus, the images photographed by the fisheye cameras 1a to 1d are view-converted into a graphics projected on a ground plane.

As described above, conventionally, images of the multiple cameras are projected onto a plain ground to generate a top-view image. However, when the vehicle body is tilted relative to the ground by passengers, the camera positions change and the positional relationship between the cameras and the projection plain is displaced. As a result, there is a problem in that connections of images photographed by the multiple cameras are displaced in the top-view image. FIGS. 24A and 24B illustrate such a problem. FIG. 24A shows a case in which the vehicle body is not titled and FIG. 24B shows a case in which the vehicle body is tilted by θ as a result of an increase in the number of passengers in the back seats. In the case of FIG. 24B, the position of the camera 1d comes down. Consequently, when the vehicle body is not tilted, no displacement occurs at connections CN of the images $IM_b$ to $IM_c$ photographed by the cameras 1b and 1c and the image $IM_d$, as shown in FIG. 25A. When the vehicle body is tilted, vertical lines at the image connections CN are displaced, as show in FIG. 25B. FIG. 25A shows a top-view image when a total of two people are in the driver's seat and the front passenger seat, and FIG. 25B shows a top-view image when a total of seven people including the two people in the driver's seat and the front passenger seat and five people in the back seats. When two people are riding in the vehicle, the connections of floor lines substantially match each other, but when seven people are riding in the vehicle, the load of the rear side of the vehicle increases to lower the camera positions, so that the positional relationships between the cameras and the projection plain are displaced. As a result, vertical lines on the floor do not connect with each other.

Japanese Unexamined Patent Application Publication No. 2002-324235 discloses a technology that makes it easy to view a screen when a composite image resulting from images photographed by multiple vehicle-mounted cameras is displayed. In the known technology, multiple cameras for photographing the surroundings of a vehicle are attached to the vehicle, and images photographed by the cameras are combined and displayed on a screen of a display apparatus. During the display, pixel data of the images are corrected so that a difference between pixel data of the adjacent images is reduced. For example, the pixel data are corrected so that averages of pixel data of the adjacent images become equal to each other, thereby making the composite image easy to view.

The known technologies described above, however, do not prevent displacement at a connection of camera images which is caused by tilt of the vehicle body from occurring in a top view image.

BRIEF SUMMARY

Accordingly, an object of the present invention is to prevent displacement at a connection of camera images which is caused by tilt of the vehicle body from occurring when a composite image, such as a top-view image, is displayed.

Still another object of the present invention is to prevent displacement at a connection of camera images which is caused by tilt of the vehicle body from occurring in a composite image such as a top-view image, by using a simple configuration.

Yet another object of the present invention is to reliably prevent displacement at a connection of camera images which is caused by tilt of the vehicle body from occurring in a composite image such as a top-view image.

The present invention provides an image display apparatus that captures surrounding images of a vehicle by using multiple cameras, combines the captured images to draw, in a frame memory, a composite image viewed from a viewpoint above the vehicle, reads image data from the frame memory, and displays the composite image.

1) Image Display Apparatus According to First Aspect

An image display apparatus according to a first aspect of the present invention includes: image memories configured to store images of a first landscape ahead of the vehicle, a second landscape at the left side of the vehicle, a third landscape at the right side of the vehicle, and a fourth landscape behind the vehicle, each of the landscapes being photographed by respective cameras; a mapping memory configured to store mapping tables indicating relationships between pixel positions in the image memories and pixel positions in a frame memory, each mapping table being provided for a corresponding predetermined number of passengers in seats exclusive of or other than vehicle front seats; a mapping-table determining unit configured to determine the mapping table to be used by a number of passengers detected; and a mapping unit configured to read image data from the image memories by using the mapping table corresponding to the number of passengers detecting and map the image data read to the frame memory.

In the image display apparatus of the first aspect, the mapping-table determining unit may include: a detector configured to detect the number of passengers in the seats exclusive of the vehicle front seats; a storage unit configured to store the mapping table to be used that corresponds to a predetermined number of passengers; and a mapping-table determination controller configured to determine the mapping table to be used according to the number of passengers in the vehicle and send a notification indicating the determined mapping table to the mapping unit. The detector may be configured by embedding, in the seats, pressure-sensitive sensors configured to detect the seating of passengers. Alternatively, the detector may include a camera provided on the ceiling of the vehicle to photograph an image of the cabin of the vehicle and an image processor configured to perform image processing on the photographed image to detect the number of passengers. Alternatively, the detector may include infrared sensors configured to detect the passengers.

The image display apparatus according to the first aspect may further include an image processor configured to retrieve a composite image drawn in the frame memory and detect an amount of white-line displacement at a connection of two image portions read from a predetermined two of the image memories and drawn. The mapping-table determining unit may correct the number of passengers based on the amount of white-line displacement and may determine the mapping table to be used according to the corrected number of passengers.

2) Image Display Apparatus According to Second Aspect

An image display apparatus according to a second aspect of the present invention includes: image memories for storing images of a landscape ahead of the vehicle, a landscape at the left side of the vehicle, a landscape at the right side of the vehicle, and a landscape behind the vehicle, the landscapes being photographed by respective cameras; a mapping memory for storing mapping tables indicating relationships between pixel positions in the image memories and pixel positions in a frame memory, each mapping table being provided for a corresponding predetermined range of a total weight of passengers in seats excluding a vehicle front seats; a mapping-table determining unit for determining the mapping table to be used, by detecting the total weight of the passengers; and a mapping unit for reading image data from the image memories by using the mapping table corresponding to the detected total weight of the passengers and mapping the read image data to the frame memory.

The mapping-table determining unit in the image display apparatus according to the second aspect may include: a detector for detecting the total weight of the passengers in the seats excluding the vehicle front seats; a storage unit for storing the mapping table to be used, so as to correspond to a range of the total weight of the passengers; and a mapping-table determination controller for determining the mapping table to be used according to the total weight of the passengers and sending a notification indicating the determined mapping table to the mapping unit.

The detector may be configured by embedding, in the seats, weight-detecting sensors for detecting the weights of passengers. A trunk of the vehicle may have a baggage-weight detecting sensor and the weight of baggage may be included in the total weight of the passengers.

The image display apparatus according to the second embodiment further include an image processor for retrieving a composite image drawn in the frame memory and detecting an amount of white-line displacement at a connection of two image portions read from a predetermined two of the image memories and drawn. The mapping-table determining unit may correct the total weight based on the amount of white-line displacement, and may determine the mapping table to be used according to the corrected total weight.

3) Image Display Apparatus According to Third Aspect

An image display apparatus according to a third aspect of the present invention includes: image memories for storing images of a landscape ahead of the vehicle, a landscape at the left side of the vehicle, a landscape at the right side of the vehicle, and a landscape behind the vehicle, the landscapes being photographed by respective cameras; a mapping memory for storing mapping tables indicating relationships between pixel positions in the image memories and pixel positions in a frame memory, each mapping table being provided for a corresponding predetermined vehicle height, which is a distance between a vehicle body and a vehicle shaft; a mapping-table determining unit for determining the mapping table to be used, by detecting the vehicle height; and a mapping unit for reading image data from the image memories by using the mapping table corresponding to the detected vehicle height and mapping the read image data to the frame memory.

The mapping-table determining unit may include a detector for detecting the vehicle height; a storage unit for storing the mapping table to be used, so as to correspond to a range of the vehicle height; and a mapping-table determination controller for determining the mapping table to be used according to the vehicle height and sending a notification indicating the determined mapping table to the mapping unit.

4) Image Display Apparatus According to Fourth Aspect

An image display apparatus according to a fourth aspect of the present invention includes: image memories for storing images of a landscape ahead of the vehicle, a landscape at the left side of the vehicle, a landscape at the right side of the vehicle, and a landscape behind the vehicle, the landscapes being photographed by respective cameras; a mapping memory for storing mapping tables indicating relationships between pixel positions in the image memories and pixel positions in a frame memory; a mapping unit for reading image data from the image memories by using a predetermined one of the mapping tables and mapping the read image data to the frame memory; an image processor for retrieving a composite image drawn in the frame memory and detecting an amount of white-line displacement at a connection of two image portions read from a predetermined two of the image memories and drawn; and a mapping-table determining unit for determining the mapping table to be used, based on the detected amount of white-line displacement and sending a notification indicating the determined mapping table to the mapping unit.

When the vehicle is traveling straight at a predetermined speed or more, the image processor may detect the amount of white-line displacement. The mapping-table determining unit may include a storage unit for storing the mapping table to be used, so as to correspond to the amount of white-line displacement, and a mapping-table determination controller for determining the mapping table to be used according to the amount of white-line displacement and sending a notification indicating the determined mapping table to the mapping unit.

According to the present invention, since the mapping tables are switched to generate and display a composite image in accordance with the number of back-seat passengers, the total weight of back-seat passengers, or the vehicle height, it is possible to prevent displacement at a connection of camera images which is caused by tilt of the vehicle body.

According to the present invention, it is possible to prevent displacement at a connection of camera images which is caused by tilt of the vehicle body, by using a simple configuration that additionally includes a detector for detecting the number of back-seat passengers, a detector for the total weight of back-seat passengers, or a detector for detecting the vehicle height and mapping tables corresponding to the number of back-seat passengers, the total weight of back-seat passengers, or the vehicle height.

According to the present invention, the amount of white-line displacement at a connection at which a predetermined two camera images are combined is detected, the number of passengers or the total weight is corrected based on the amount of white-line displacement, and a mapping table to be used is determined based on the corrected number of passengers or the corrected total weight. Thus, it is possible to reliably prevent displacement at the connection of the camera images which is caused by tilt of the vehicle body.

According to the present invention, the amount of white-line displacement at a connection at which a predetermined two camera images are combined is detected and a mapping table to be used is determined based on the amount of white-line displacement. Thus, it is possible to reliably prevent displacement at the connection of the camera images which is caused by tilt of the vehicle body.

BRIEF DESCRIPTION OF THE DRAWINGS

FIG. 20 shows a control flow of a mapping-table determination controller;

FIG. 22 is a diagram illustrating a case in which fisheye graphics photographed by fisheye cameras are mapped to a frame memory for a screen;

DETAILED DESCRIPTION OF THE PREFERRED EMBODIMENTS

A) First Embodiment

Figure 1:
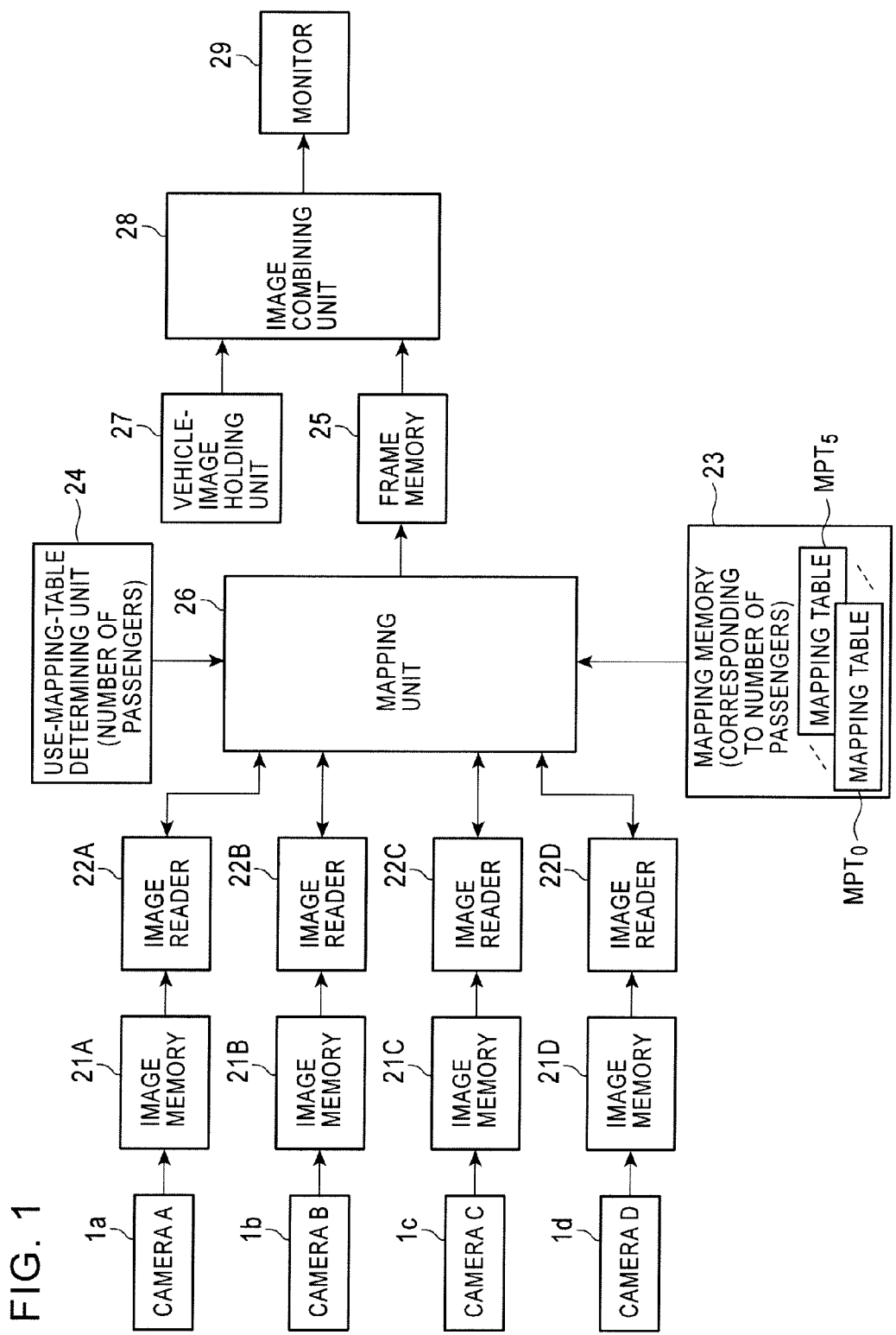
FIG. 1 is a block diagram of an image display apparatus according to a first embodiment of the present invention.

FIG. 1 is a block diagram of an image display apparatus according to a first embodiment of the present invention.

Figure 21A:
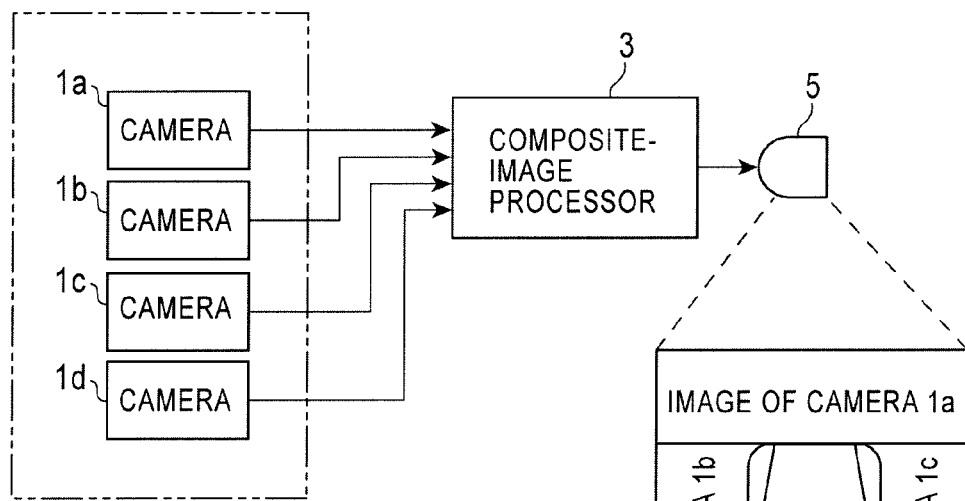
FIGS. 21A to 21C illustrate a known top-view system.
Figure 21B:
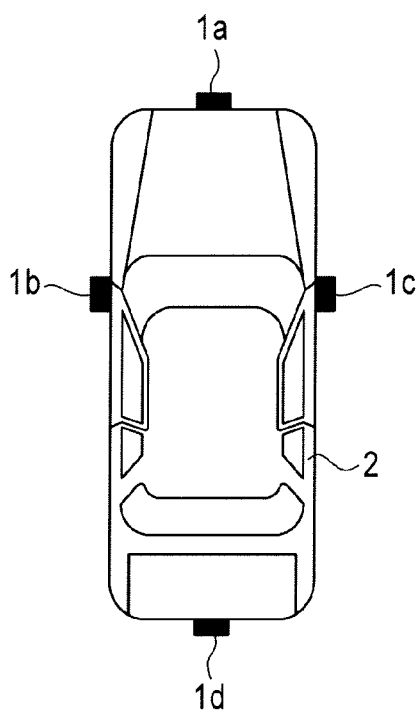
Figure 21C:
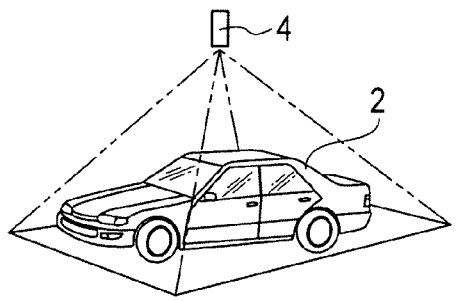
Figure 23A:
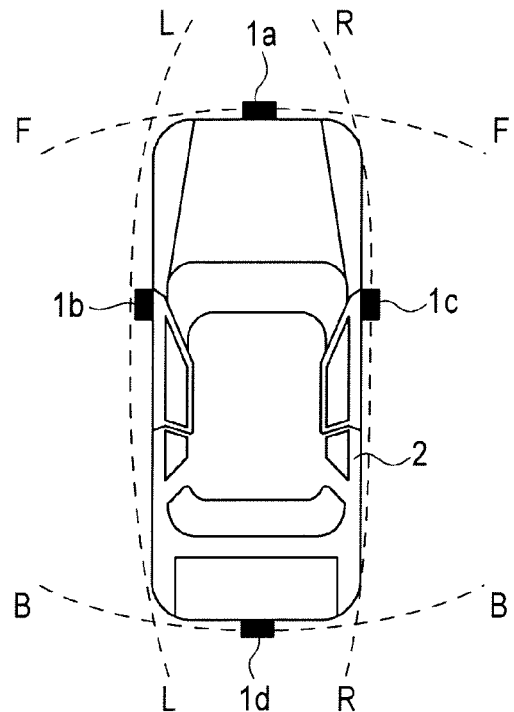
FIGS. 23A to 23C illustrate details of a mapping method.
Figure 23B:
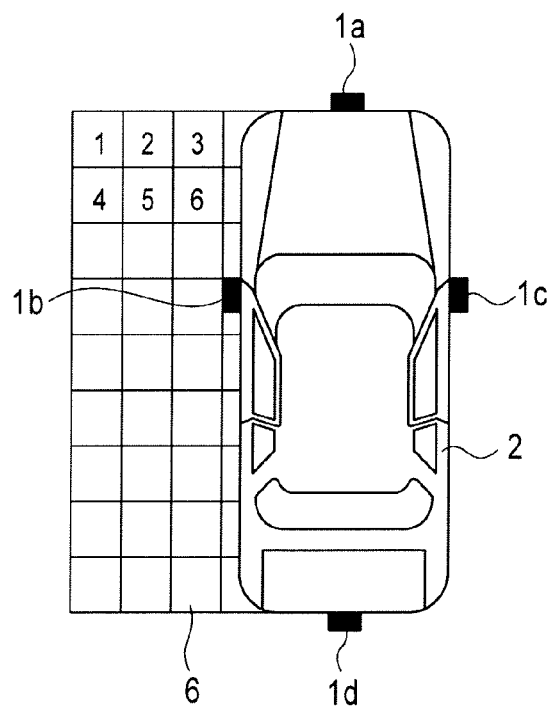
Figure 23C:
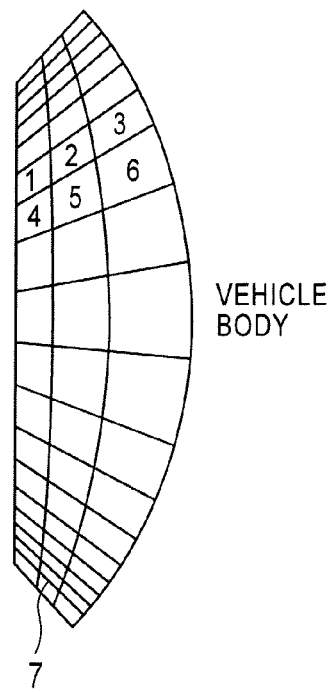
Figure 24A:
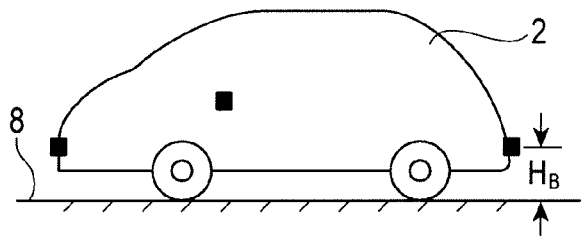
FIGS. 24A and 24B illustrate tilt of a vehicle body.
Figure 24B:
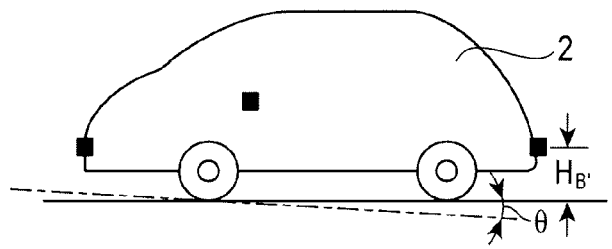

Cameras 1a, 1b, 1c, 1d are attached to a front portion, a left-side portion, a right-side portion, and a rear portion of a vehicle 2 (see FIG. 21) to photograph a landscape ahead of the vehicle, a landscape at the left side of the vehicle, a landscape at the right side of the vehicle, and a landscape behind the vehicle. The resulting photographed images are stored in corresponding camera image memories 21A to 21D. Using a fisheye lens, each of the cameras 1a to 1d can photograph a landscape in the range of 185° in front of the camera. Image readers 22A to 22D read image data from specified addresses in the image memories 21A to 21D and output the image data, respectively.

A mapping memory 23 stores multiple mapping tables $MPT_0$ to $MPT_5$ for mapping fisheye graphics $IM_a$ to $IM_d$ (see FIG. 22), stored in the image memories 21A to 21D, to a screen frame memory 25. The mapping tables $MPT_0$ to $MPT_5$ are provided so as to correspond to, for example, zero to five passengers in back seats. Since the amount of tilt of the vehicle body varies according to the number of passengers in the back seats, the mapping tables are created so as to correspond to the number of passengers to prevent displacement from occurring at connections of images and are stored in the mapping memory 23.

A use-mapping-table determining unit 24 determines a mapping table MPT to be used, based on the number of passengers in the back seats, and sends a notification indicating the determined mapping table MPT to the mapping unit 26. The mapping unit 26 scans the indicated mapping table MPT in a raster direction to sequentially read the camera image memories and addresses thereof for each pixel. The mapping unit 26 then reads image data from the addresses in the camera frame memories and writes the read image data to the frame memory 25. When the writing processing is completed for all pixels, this means that surroundings-image data are mapped to the screen frame memory 25. A vehicle-image holding unit 27 pre-stores a vehicle image. An image combining unit 28 combines the vehicle image and the surrounding images in the screen frame memory 25 and displays the resulting composite image on a monitor 29. During the mapping, the mapping unit 6 may also write the vehicle image, held by the vehicle-image holding unit 27, to the screen frame memory 25 by using the mapping table MPT.

Figure 2:
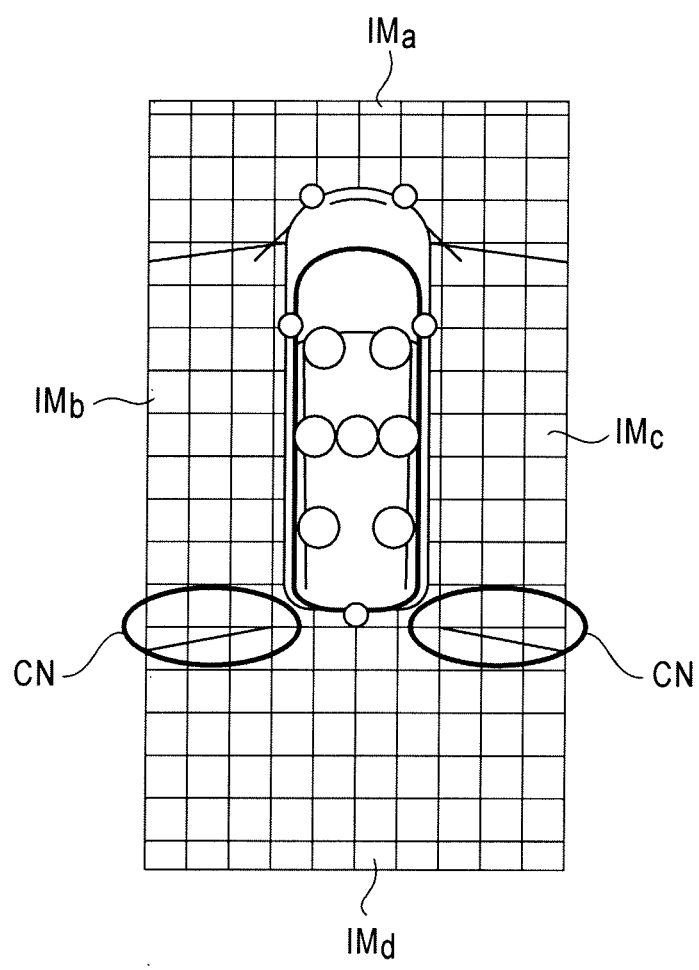
FIG. 2 shows an example of a top-view image in which occurrence of displacement at image connections is prevented by the present invention.
Figure 25:
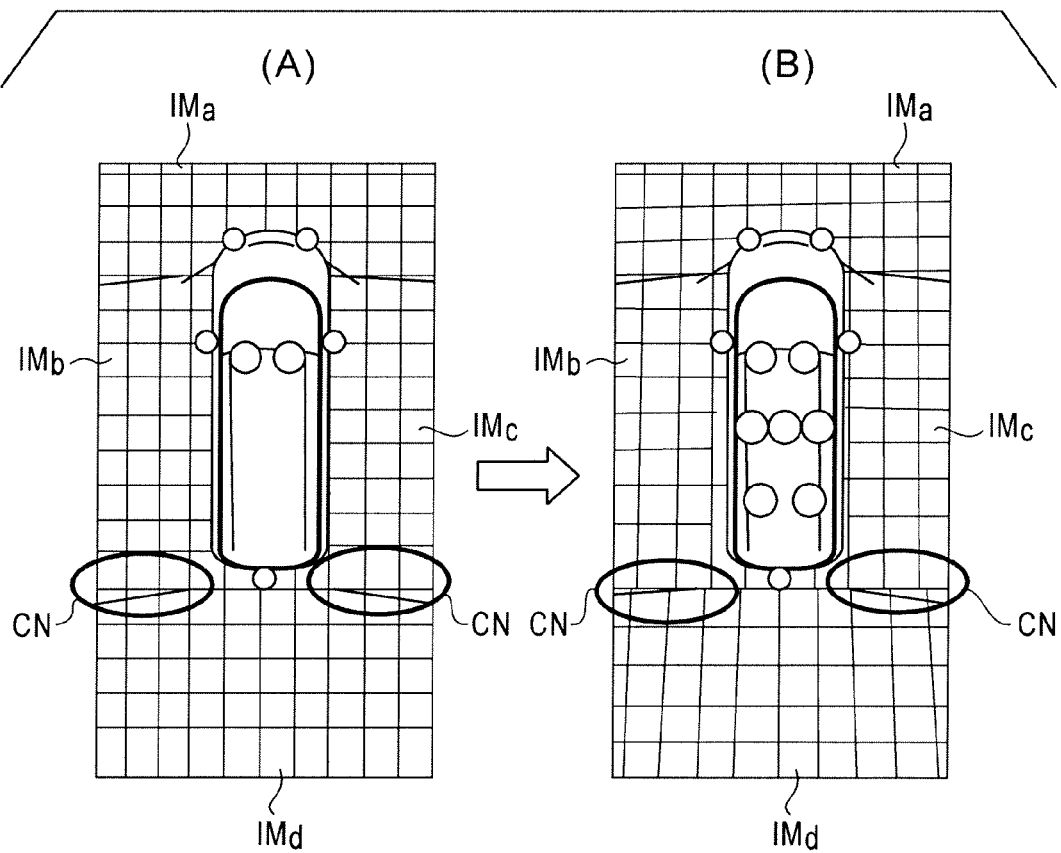
FIGS. 25A to 25B illustrate a known problem (image displacement).

The use of the mapping table MPT corresponding to the total weight of the vehicle 2 prevents displacement from occurring at connections CN between the images $IM_b$ and $IM_c$ photographed by the cameras 1b and 1c and the image $IM_d$ photographed by the camera 1d, even when the number of back-seat passengers is five, as shown in FIG. 2. Conventionally, as shown in FIG. 25B, displacement occurs along vertical lines at the image connections CN.

Figure 3:
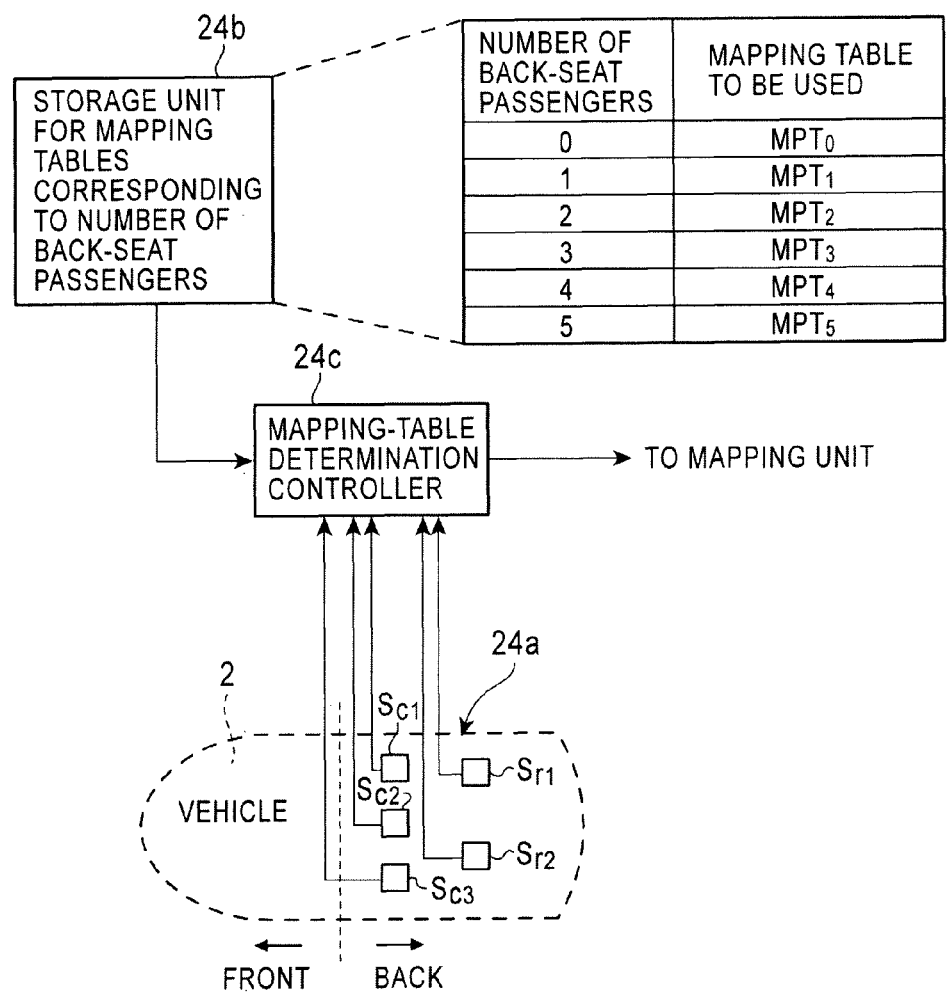
FIG. 3 is a diagram of the configuration of a use-mapping-table determining unit.
Figure 4:
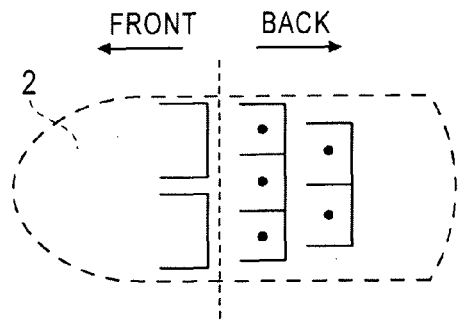
FIG. 4 is a schematic diagram illustrating seats in a vehicle.

FIG. 3 is a diagram of the use-mapping-table determining unit 24. The use-mapping-table determining unit 24 includes a detector 24a for detecting the number of passengers in the back seats, a storage unit 24b for storing the IDs (identifiers) $MPT_0$ to $MPT_5$ of the mapping tables used according to the number of passengers in the back seats, and a mapping-table determination controller 24c for determining the ID of the use mapping table corresponding to the number of passengers in the back seats and sending a notification indicating the ID to the mapping unit 26. When the vehicle 2 is a seven-seater vehicle as shown in FIG. 4, the front seats are located ahead of the dotted line and the back seats are located behind the dotted line. The vehicle body is tilted by the passenger(s) in the back seats and the tilt angle depends on the number of passengers. The detector 24a is configured by embedding, in the back seats, pressure-sensitive sensors Sc1 to Sc3, Sr1, and Sr2 for detecting the seating of passengers. The mapping-table determination controller 24c detects the number of passengers in accordance with the on/off states of the pressure-sensitive sensors Sc1 to Sc3, Sr1, and Sr2. The mapping-table determination controller 24c then obtains the ID of the mapping table corresponding to the number of detected passengers from the storage unit 24b and sends a notification indicating the ID to the mapping unit 26.

Although the mapping tables in the above description are provided so as to correspond to the number of passengers in the back seats, they may be provided so as to correspond to the number of all people in the vehicle. Although the mapping tables in the above description are provided so as to correspond to the number of passengers in the vehicle, a mapping table corresponding to one to two passengers, a mapping table for three to four passengers, and a mapping table for five passengers may be provided.

Another configuration of the use-mapping-table determining unit will now be described.

Figure 5:
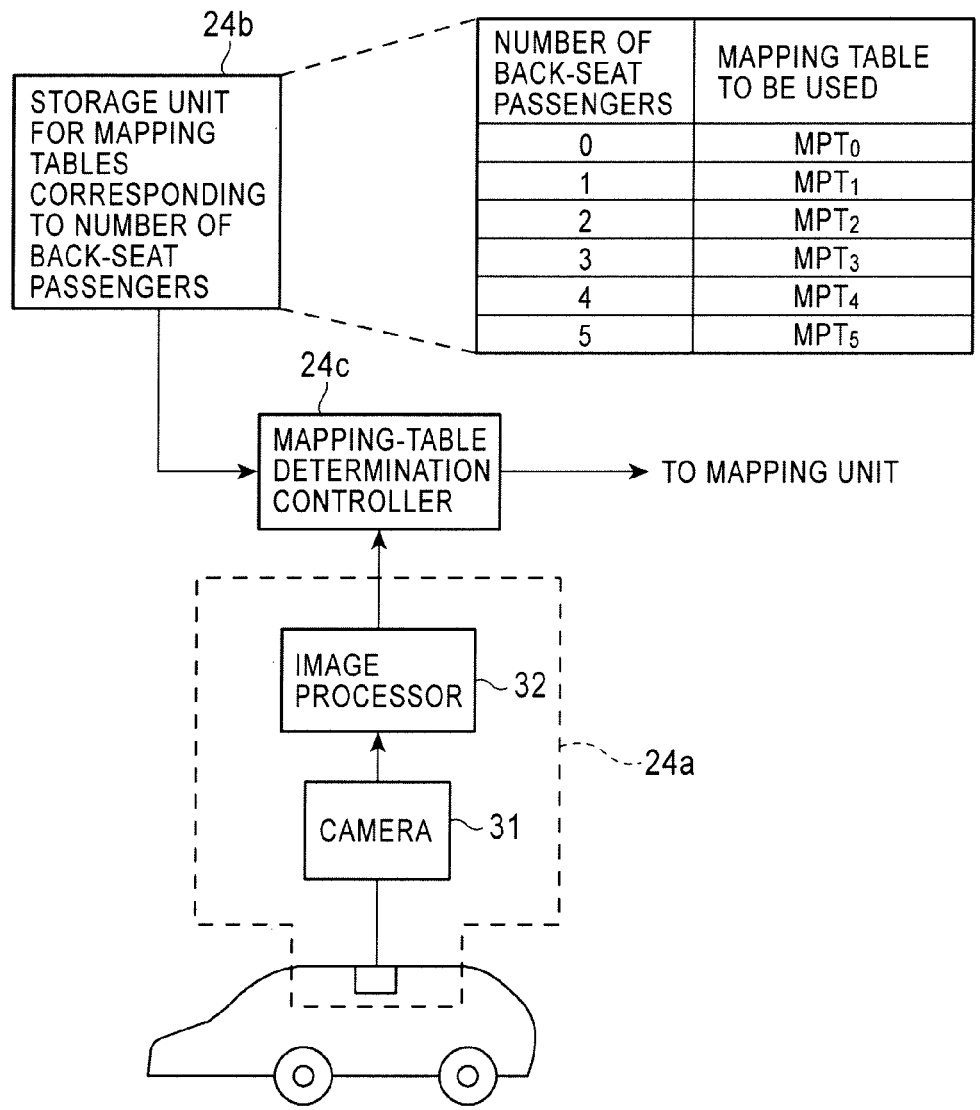
FIG. 5 is a diagram of the configuration of a use-mapping-table determining unit.

FIG. 5 is a diagram showing another configuration of the use-mapping-table determining unit. The same units as those in FIG. 3 are denoted by the same reference numerals. The configuration of a detector 24a for detecting the number of passengers in the back seats is different from the configuration of the detector 24a shown in FIG. 3. The detector 24a shown in FIG. 5 includes a camera 31 provided at the ceiling of the vehicle to photograph the cabin thereof and an image processor 32 for performing image processing on the image photographed by the camera 31 to detect the number of passengers. A mapping-table determination controller 24c obtains, from a storage unit 24b, the ID of the mapping table corresponding to the number of passengers detected by the image processor 32 and sends a notification indicating the ID to the mapping unit 26.

Figure 6:
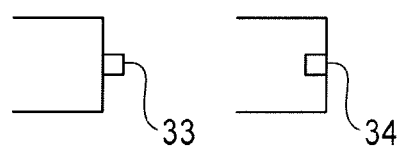
FIG. 6 is a diagram illustrating a principle for detecting passengers through the use of infrared sensors.

The detector 24a for detecting the number of passengers in the back seats may also be constituted by infrared-sensor light-emitting devices 33 and light-receiving devices 34, as shown in FIG. 6. That is, the light-receiving device 34 is provided on a backrest portion of each back seat and the light-emitting device 33 is provided on a back portion of the front seat. With this arrangement, the number of passengers can be detected, as in the case with the pressure-sensitive sensor.

Although the first embodiment has been described in conjunction with the seven-seater vehicle, the present invention is applicable to any number of passengers and this is also true for the embodiments described below.

According to the first embodiment described above, it is possible to prevent displacement at connections of camera images which is caused by tilt of the vehicle body. Also, it is possible to prevent displacement at camera-image connections which is caused by tilt of the vehicle body, by using a simple configuration that additionally includes only the detector for detecting the number of back-seat passengers and the multiple mapping tables corresponding to the number of back-seat passengers.

B) Second Embodiment

Figure 7:
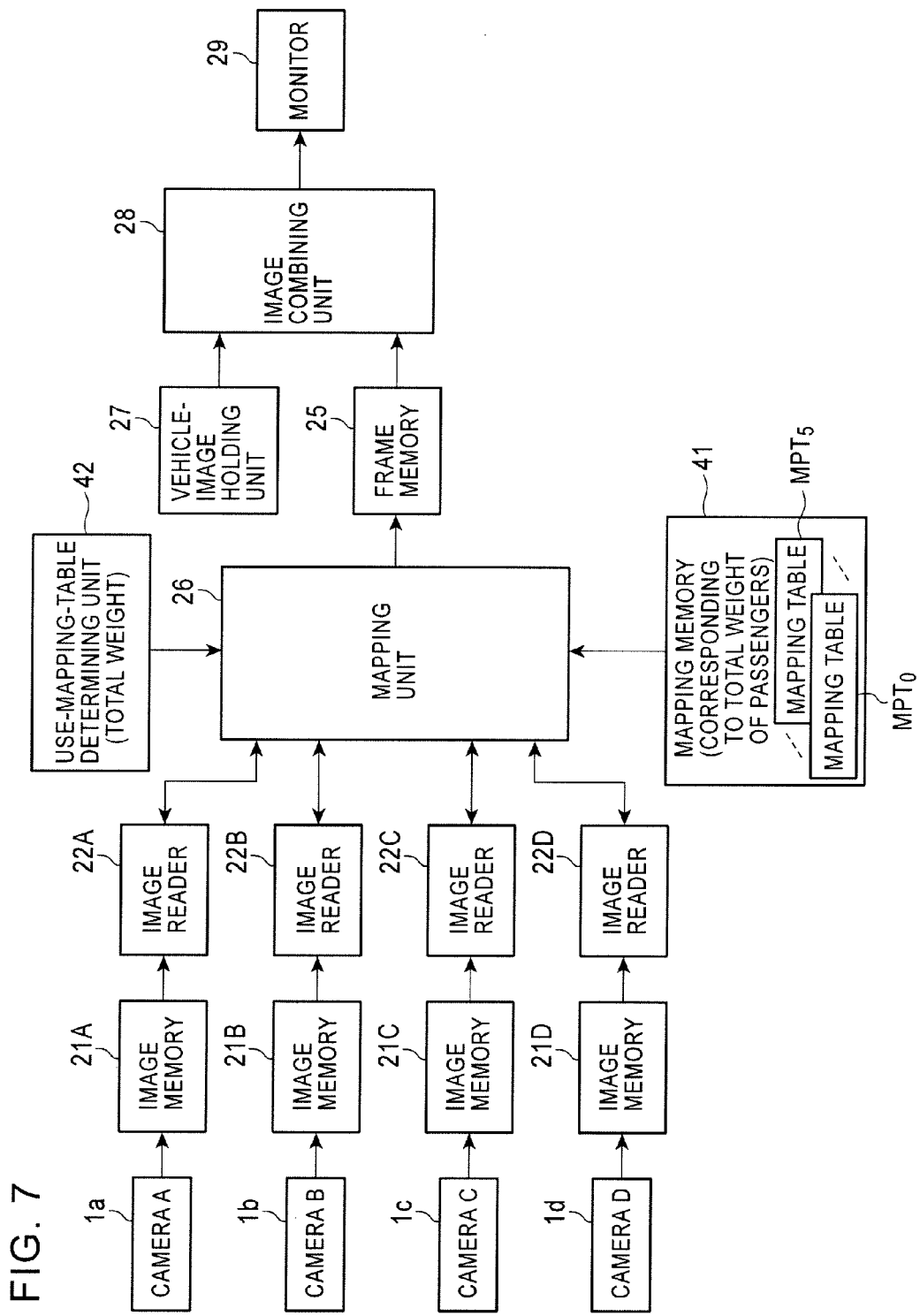
FIG. 7 is a block diagram of an image display apparatus according to a second embodiment of the present invention.

FIG. 7 is a block diagram of an image display apparatus according to a second embodiment of the present invention. The same units as those in the first embodiment shown in FIG. 1 are denoted by the same reference numerals. The second embodiment is different from the first embodiment in that a mapping memory 41 stores mapping tables $MPT_0$ to $MPT_5$ so as to correspond to the total weight W of the back-seat passengers, and a use-mapping-table determining unit 42 determines a mapping table to be used, based on the total weight W of the back-seat passengers and sends a notification indicating the determined mapping table to the mapping table 26. Since the amount of tilt of the vehicle body varies according to the total weight W of the back-seat passengers, the mapping tables are created so as to correspond to the total weight W of the back-seat passengers to prevent displacement from occurring at connections of images and are stored in the mapping memory 41.

Figure 8:
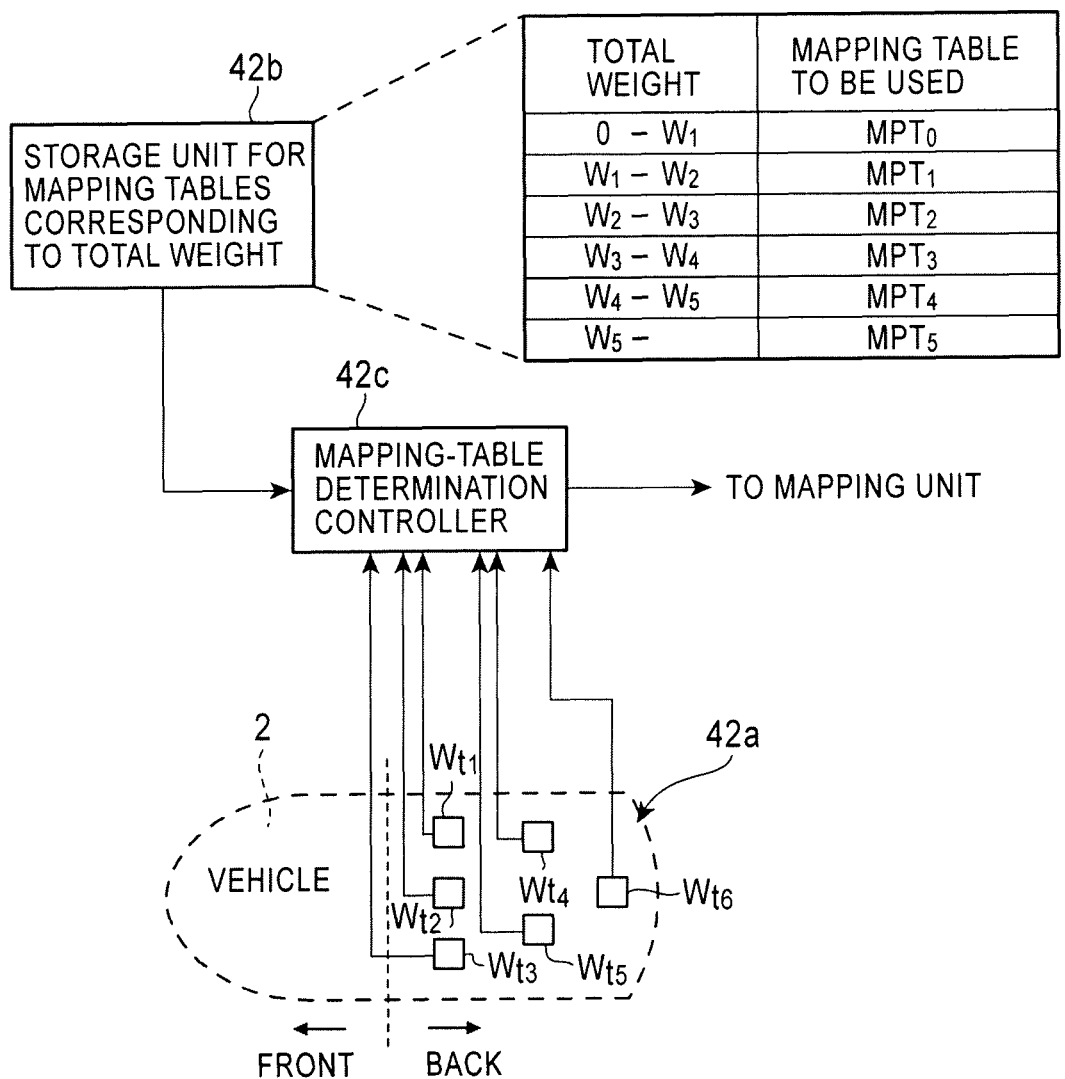
FIG. 8 is a diagram of the configuration of a use-mapping-table determining unit in the second embodiment.

FIG. 8 is a diagram of the use-mapping-table determining unit 42. The use-mapping-table determining unit 42 includes a detector 42a for detecting the total weight W of the back-seat passengers, a storage unit 42b for storing IDs (identifiers) $MPT_0$ to $MPT_5$ of the mapping tables used according to the total weight W of the back-seat passengers, and a mapping-table determination controller 42c for determining the ID of the mapping table to be used according to the total weight W of the back-seat passengers and sending a notification indicating the ID to the mapping unit 26. When the vehicle 2 is a seven-seater vehicle, the front seats are located ahead of the dotted line and the back seats are located behind the dotted line. The vehicle body is tilted by the passenger(s) in the back seats and the tilt angle depends on the total weight of the passengers. The detector 42a is configured by embedding, in the back seats, strain-gauge weight sensors wt1 to wt5 (which operate according to the same principle of electronic scales) for detecting the weights of the passengers. The mapping-table determination controller 42c adds up the individual weights received from the weight sensors wt1 to wt5 to determine the total weight W of the passengers, obtains the ID of the mapping table corresponding to the total weight W from the storage unit 42b, and sends a notification indicating the ID to the mapping unit 26.

Although the mapping tables described above are provided so as to correspond to the total weights of the back-seat passengers, a sensor wt6 for detecting the weight of baggage put in the trunk of the vehicle may also be provided to determine the total weight including the baggage weight.

According to the second embodiment, it is possible to prevent displacement at connections of camera images which is caused by tilt of the vehicle body. Also, it is possible to prevent displacement at connections of camera images which is caused by tilt of vehicle body, by using a simple configuration that additionally includes only the detector for detecting a total weight of passengers and the multiple mapping tables corresponding to the total weight of the passengers.

Since the second embodiment is adapted to detect the weight, a top-view image that has no displacement at image connections can be generated by using the predetermined mapping tables, even whether the passengers are adults or children cannot be determined. With this arrangement, since the baggage weight can also be included in the total weight, a top-view image that has no displacement at image connections can be generated by using the appropriate mapping table.

C) Third Embodiment

Figure 9:
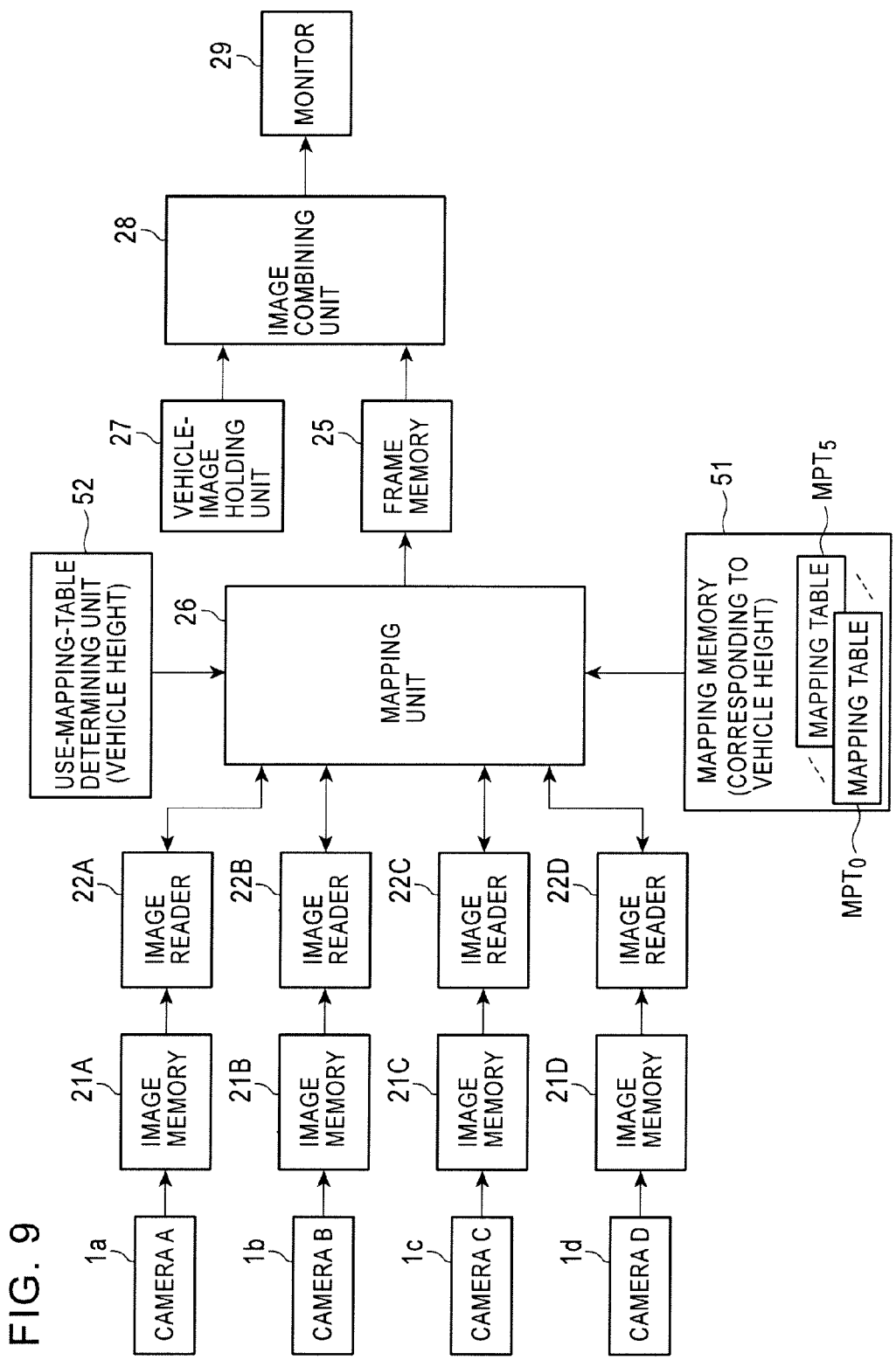
FIG. 9 is a block diagram of an image display apparatus according to a third embodiment of the present invention.

FIG. 9 is a block diagram of an image display apparatus according to a third embodiment of the present invention. The same units as those in the first embodiment shown in FIG. 1 are denoted by the same reference numerals. The third embodiment is different from the first embodiment in the following points. That is, a mapping memory 51 stores multiple mapping tables $MPT_0$ to $MPT_5$ pre-created so as to correspond to the vehicle height, which is a distance between the vehicle body and the vehicle shaft, so as to prevent displacement at connections of images, and a use-mapping-table determining unit 52 determines a mapping table to be used according to the vehicle height, and sends a notification indicating the determined mapping table to the mapping unit 26. The amount of tilt of the vehicle body and the vehicle height change according to the back-seat passengers and baggage.

Thus, the multiple mapping tables are pre-created according to the vehicle heights so as to prevent displacement from occurring at connections of images, and are stored in the mapping memory 51.

Figure 10:
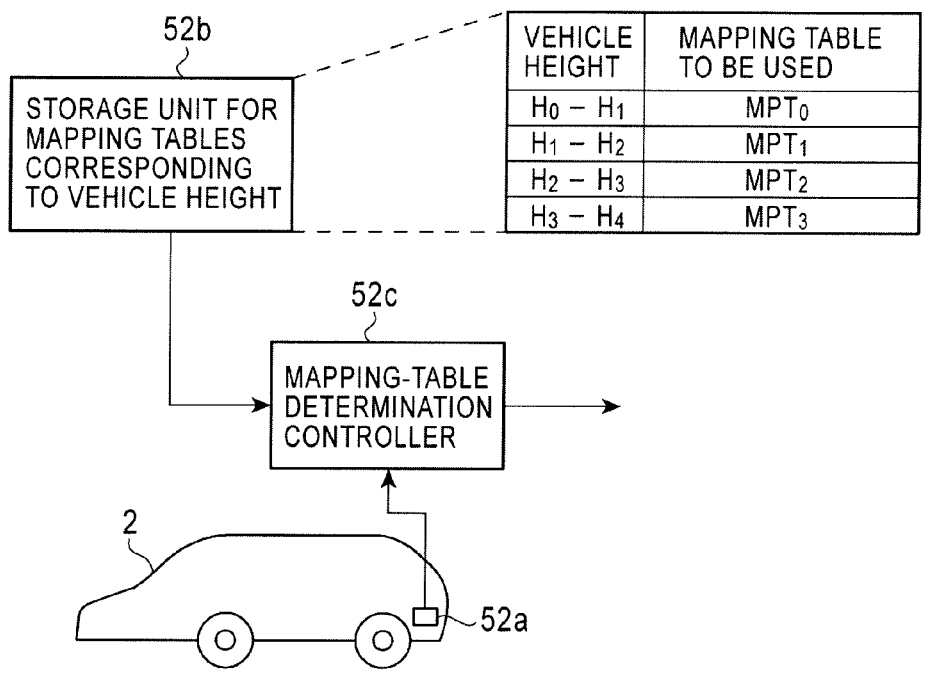
FIG. 10 is a diagram of the configuration of a use-mapping-table determining unit in the third embodiment.

FIG. 10 is a diagram of the use-mapping-table determining unit 52. The use mapping-table determining unit 52 includes a known vehicle-height detector 52a for detecting the vehicle height, a storage unit 52b for storing IDs (identifiers) $MPT_0$ to $MPT_5$ of the mapping tables to be used so as to correspond to the total weight including the back-seat passengers and the baggage, and a mapping-table determination controller 52c for determining the ID of the mapping table to be used according to the vehicle height and sending a notification indicating the ID to the mapping unit 26.

Figure 11:
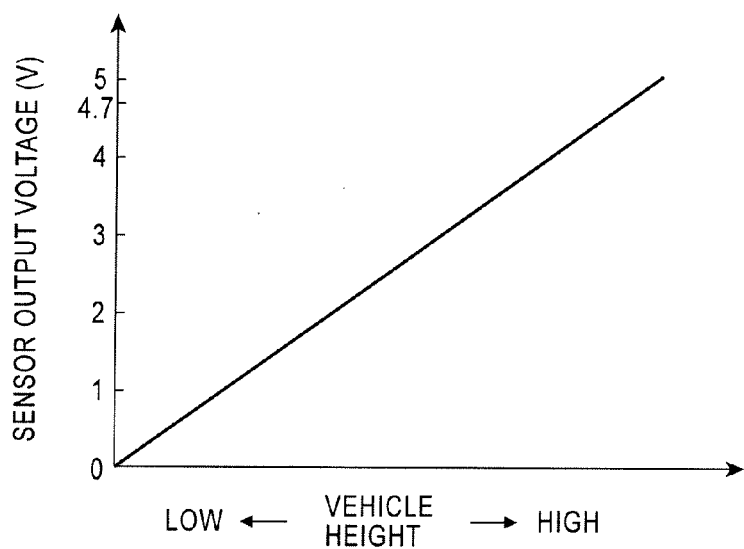
FIG. 11 is a graph showing an output characteristic of a vehicle-height detector.

The vehicle-height detector 52a detects the vehicle height by generating an output voltage shown in FIG. 11 with respect to the vehicle height, and the mapping-table determination controller 52c obtains the ID of the mapping table corresponding to the vehicle height from the storage unit 52b and sends a notification indicating the ID to the mapping unit 26.

According to the third embodiment, it is possible to prevent displacement at connections of camera images which is caused by tilt of the vehicle body. Also, it is possible to prevent displacement at connections of camera images which is caused by tilt of the vehicle body by using a simple configuration that additionally includes only the detector for detecting the vehicle height and the multiple mapping tables corresponding to the vehicle heights.

D) Forth Embodiment

Figure 12:
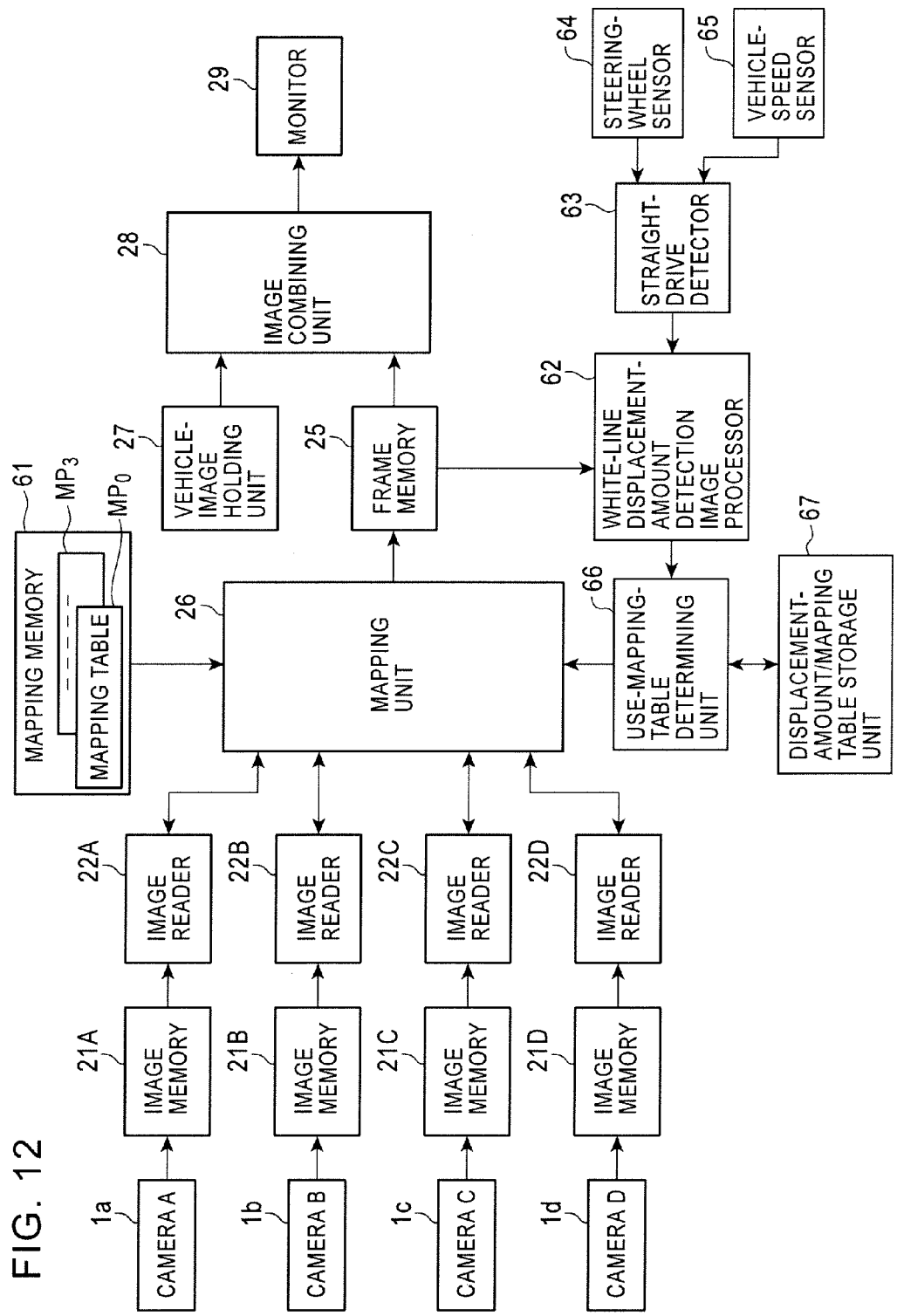
FIG. 12 is a block diagram of an image display apparatus according to a fourth embodiment of the present invention.

FIG. 12 is a block diagram of an image display apparatus according to a fourth embodiment of the present invention. The same units as those in the first embodiment shown in FIG. 1 are denoted by the same reference numerals. In the fourth embodiment, a mapping table used when the vehicle body is not tilted is used as a reference mapping table to detect an amount of displacement of a white line at an image connection, and a mapping table to be used is determined based on the detected amount of displacement.

Figure 13A:
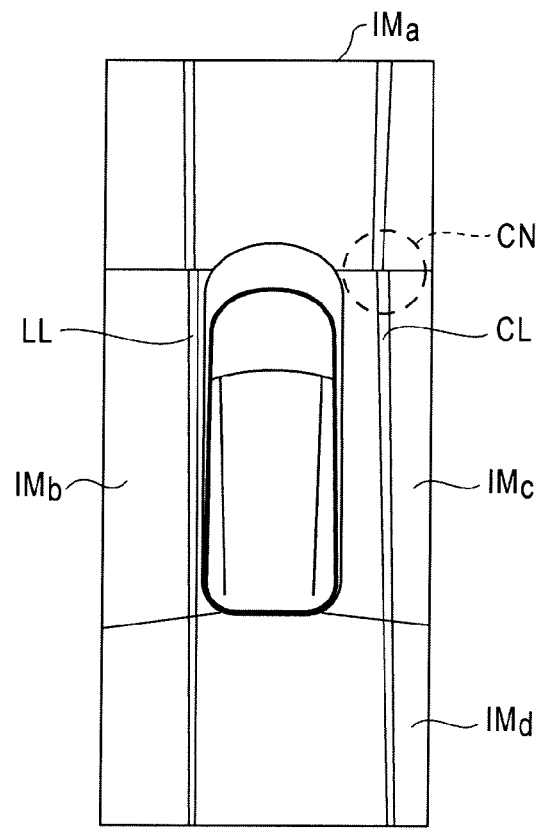
FIGS. 13A and 13B are diagrams illustrating white-line displacement at an image connection.
Figure 13B:
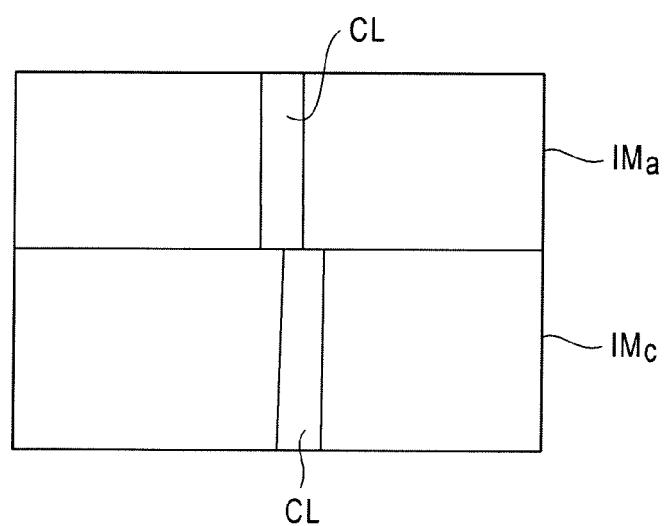

The mapping memory 61 stores multiple mapping tables MP0 to MP3, which are pre-created so as to correspond to the amount of white-line displacement at an image connection when a reference mapping table is used and so as to prevent the displacement. When the vehicle body is titled, a road white line, such as a center line CL or a lane dividing line LL, is displaced at its image connection, as shown in FIG. 13A, and the amount of displacement increases according to an increase in the tilt of the vehicle body. FIG. 13B is a partial enlarged diagram of an image connection CN shown in FIG. 13A.

Thus, a white-line displacement-amount detection image processor 62 detects the amount of white-line displacement at the image connection. The amount of white-line displacement can be detected with high accuracy when the vehicle is traveling straight at a predetermined speed or more, for example, at a speed of 30 km/h or more. Thus, based on signals received from a steering-wheel angle sensor 64 and a vehicle-speed sensor 65, a straight-drive detector 63 detects a state in which the vehicle is traveling straight at a speed of 30 km/h or more and generates information indicating the state to the white-line displacement-amount detection image processor 62. When the vehicle enters the state in which it is traveling straight at a speed of 30 km/h or more, the white-line displacement-amount detection image processor 62 reads a top-view image stored in the frame memory 25, performs image processing, detects an amount of white-line displacement at a connection of predetermined two image portions, and sends a signal representing the detected amount of white-line displacement to a use-mapping-table determining unit 66.

The use mapping-table determining unit 66 obtains a mapping-table ID from a built-in storage unit 67, in which relationships between the amounts of displacement and the IDs of mapping tables are stored, and sends a notification indicating the ID to the mapping unit 26. Subsequently, using the indicated mapping table, the mapping unit 26 draws a top-view image in the frame memory 25.

Figure 14:
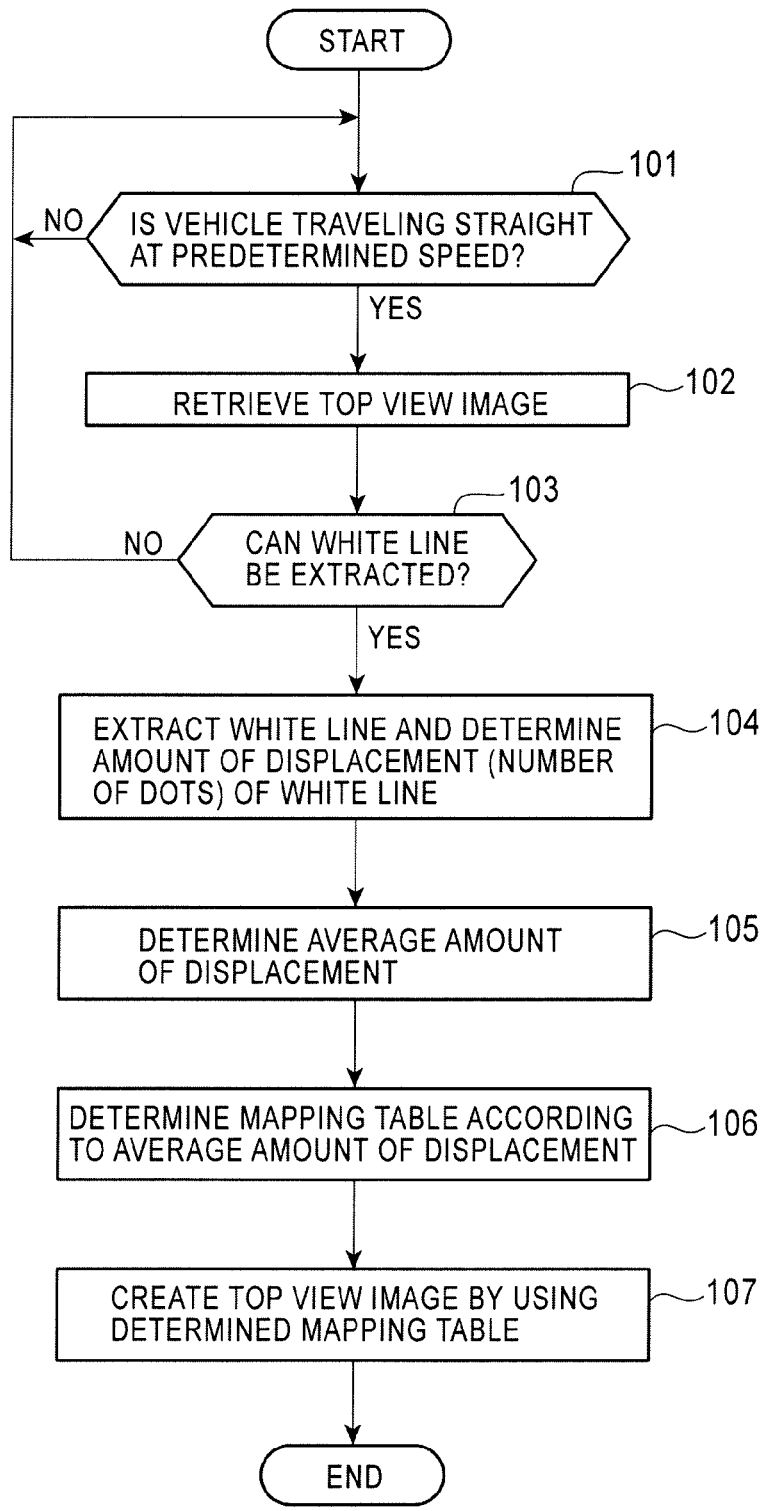
FIG. 14 is a processing flow of top-view image display according to the fourth embodiment.

FIG. 14 is a processing flow of top-view image display according to the fourth embodiment.

In step 101, the white-line displacement-amount detection image processor 62 checks whether or not the vehicle is traveling straight at a speed of 30 km/h or more. When the result is YES, the white-line displacement-amount detection image processor 62 retrieves a top-view image from the frame memory 25 in step 102. In step 103, the white-line displacement-amount detection image processor 62 checks whether or not a road center line or lane dividing line can be extracted. When the line cannot be extracted, the process returns to the start of the flow. On the other hand, when the line is extracted, in step 104, the white-line displacement-amount detection image processor 62 detects, as the number of dots, an amount of white-line displacement at a connection of predetermined two image portions. In step 105, the white-line displacement-amount detection image processor 62 detects the amount of displacement a predetermined number of times, determines an average amount of displacement thereof, and inputs the average amount of displacement to the use mapping-table determining unit 66. In step 106, based on the input amount of displacement, the use mapping-table determining unit 66 obtains a mapping-table ID from the storage unit 67, in which the relationships between the amounts of displacement and IDs of the mapping tables are stored, and sends a notification indicating the obtained ID to the mapping unit 26. In step 107, using the indicated mapping table, the mapping unit 26 draws a top-view image in the frame memory 25.

According to the fourth embodiment, it is possible to prevent displacement at connections of camera images which is caused by tilt of the vehicle body.

E) Fifth Embodiment

Figure 15:
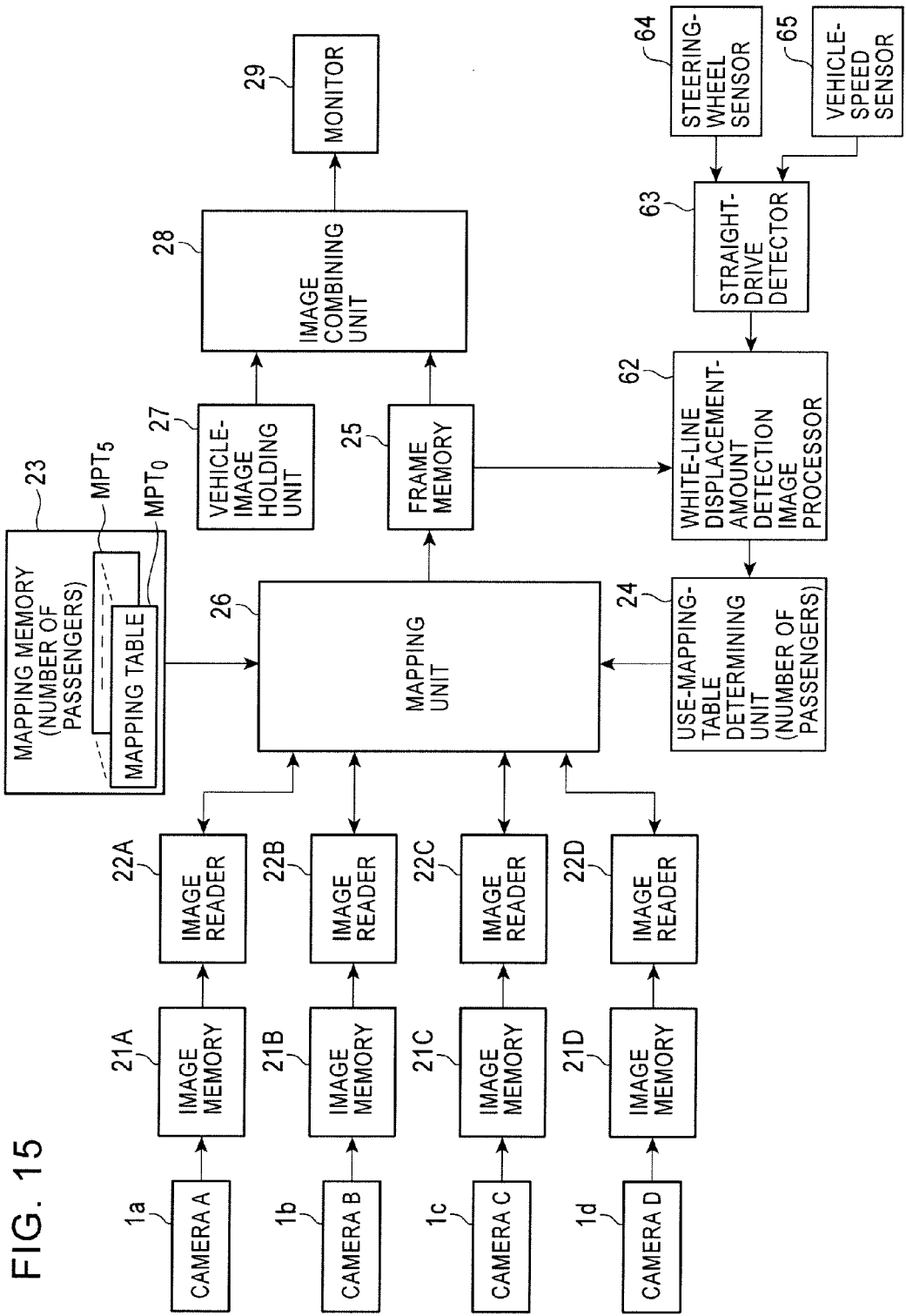
FIG. 15 is a block diagram of an image display apparatus according to a fifth embodiment of the present invention.

FIG. 15 is a block diagram of an image display apparatus according to a fifth embodiment of the present invention. The same units as those in the first embodiment shown in FIG. 1 and the forth embodiment shown in FIG. 12 are denoted by the same reference numerals.

The fifth embodiment is different from the first embodiment in the following points. An amount of white-line displacement at an image connection is detected, the number of back-seat passengers is corrected based on the detected amount of displacement, and a mapping table to be used is determined based on the corrected number of passengers. The credibility of the number of passengers varies depending on whether the passengers are adults or children. For example, when the apparatus is designed based on the assumption that the number of passengers is the number of adult passengers, a correct number of passengers cannot be detected when a child or children are in the vehicle. Thus, the smaller the child is and the greater the number of children is, the lower the credibility of the number of passengers becomes. The credibility also decreases when baggage is in the trunk of the vehicle. Accordingly, in the fifth embodiment, a mapping table corresponding to the number of detected passengers is used to generate a top-view image, and when a white-line displacement exists, the number of passengers is corrected, and a mapping table to be used is determined based on the corrected number of passengers.

Figure 16:
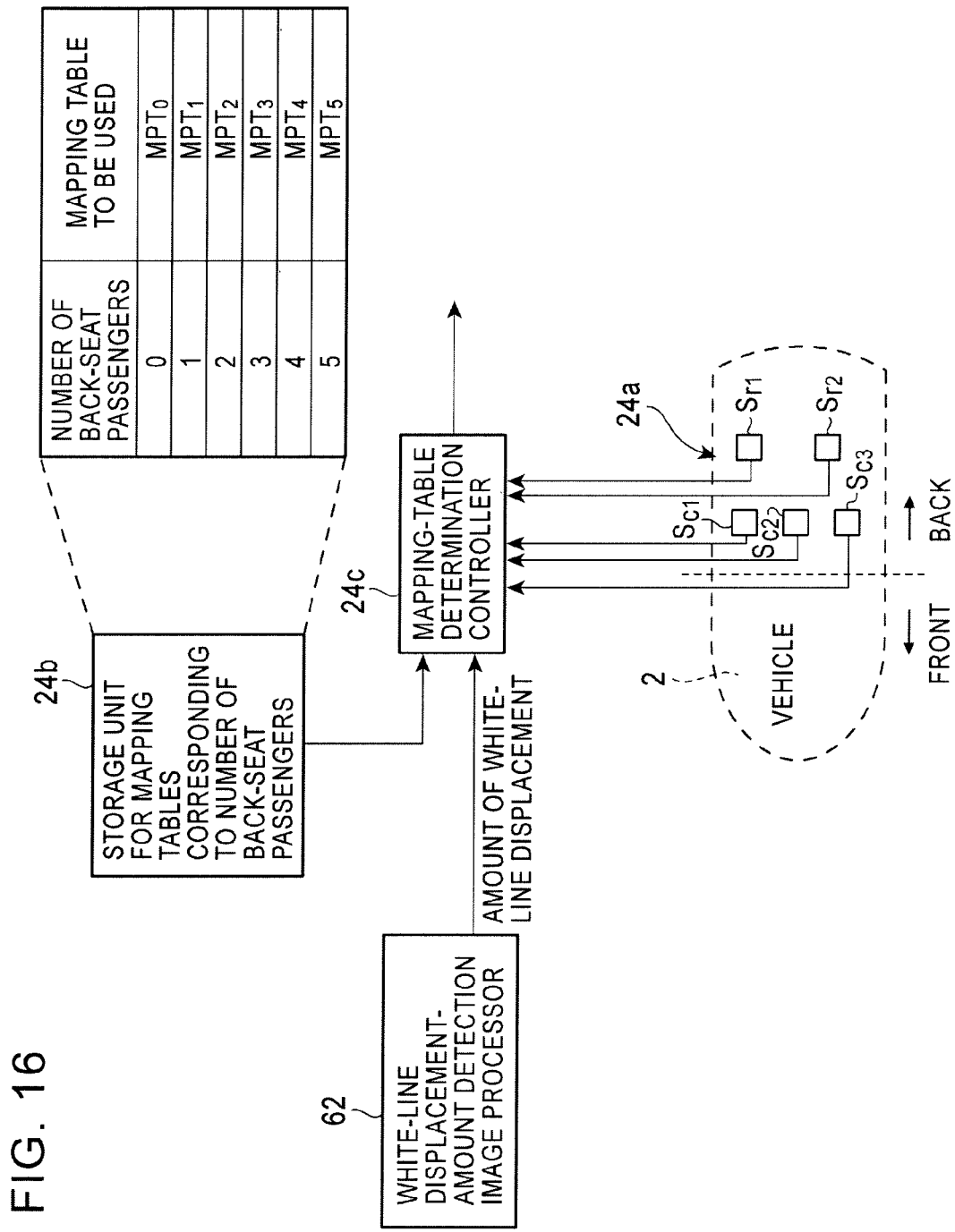
FIG. 16 is a diagram of the configuration of a use-mapping-table determining unit in the fifth embodiment.

FIG. 16 is a diagram of the use-mapping-table determining unit 24 according to the fifth embodiment. The same units as those in the use-mapping-table determining unit of the first embodiment shown in FIG. 3 are denoted by the same reference numerals. The fifth embodiment is different from the first embodiment in that the amount of white-line displacement detected by the white-line displacement-amount detection image processor 62 is input to the mapping-table determination controller 24c.

When the vehicle is traveling straight at a speed of 30 km/h or more, the white-line displacement-amount detection image processor 62 detects an amount of white-line displacement at a connection of predetermined two image portions and inputs the detected amount of white-line displacement to the mapping-table determination controller 24c. When no white-line displacement exists or the amount of displacement is less than or equal to a preset value, the mapping-table determination controller 24c determines that the number of detected passengers is correct. When white-line displacement exists, the mapping-table determination controller 24c corrects (increases or reduces) the number of passengers based on the direction of the white-line displacement, obtains the ID of the mapping table corresponding to the corrected number of passengers, and sends a notification indicating the ID to the mapping unit 26.

Figure 17:
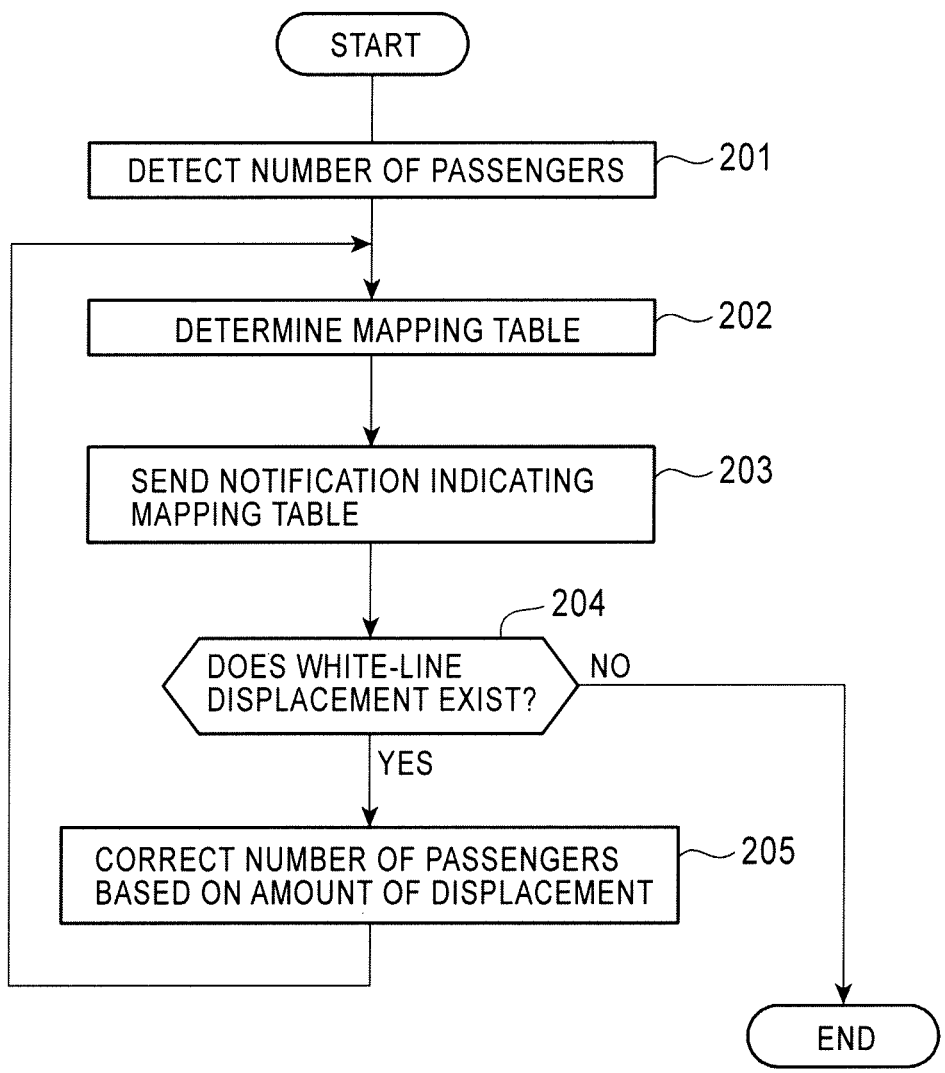
FIG. 17 shows a control flow of a mapping-table determination controller.

FIG. 17 is a control flow of the mapping-table determination controller 24c.

In step 201, the mapping-table determination controller 24c determines the number of passengers in accordance with the on/off states of the pressure-sensitive sensors. In step 202, the mapping-table determination controller 24c determines a mapping table to be used, based on the determined number of passengers. In step 203, the mapping-table determination controller 24c sends a notification indicating the determined mapping table to the mapping unit 26. The mapping unit 26 generates a top-view image by using the mapping table corresponding to the indicated number of passengers, and the white-line displacement-amount detection image processor 62 detects white-line displacement and sends a signal representing the detected amount of white-line displacement to the mapping-table determination controller 24c. In step 204, the mapping-table determination controller 24c checks whether or not the amount of white-line displacement is greater than or equal to a preset value. When the amount of white-line displacement is less than the present value, the mapping-table determination controller 24c determines that the detected number of passengers is correct and the processing ends. When the amount of white-line displacement is greater than or equal to the preset value, in step 205, the mapping-table determination controller 24c corrects the detected number of passengers based on the direction of the white-line displacement, and then performs the processing subsequent to step 202. With this arrangement, a mapping table to be used is determined based on the corrected number of passengers and the processing is repeated.

According to the fifth embodiment, the number of passengers is correctly determined, thus making it possible to reliably eliminate displacement at an image connection.

F) Sixth Embodiment

Figure 18:
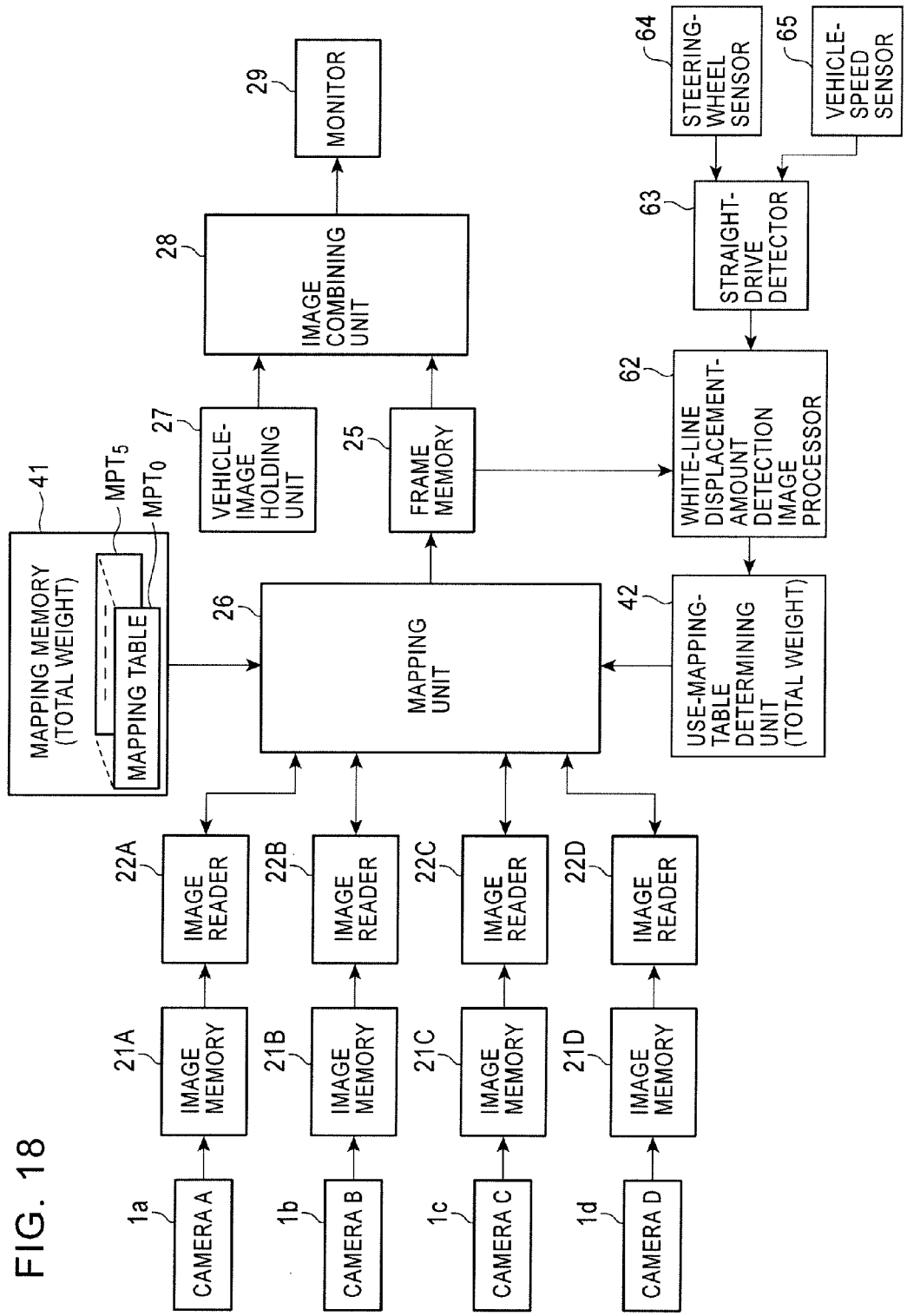
FIG. 18 is a block diagram of an image display apparatus according to a sixth embodiment of the present invention.

FIG. 18 is a block diagram of an image display apparatus according to a sixth embodiment of the present invention. The same units as those in the second embodiment shown in FIG. 7 and the forth embodiment shown in FIG. 12 are denoted by the same reference numerals.

The sixth embodiment is different from the second embodiment in that an amount of white-line displacement at an image connection is detected, the total weight of the passengers is corrected based on the detected amount of displacement, and a mapping table to be used is determined based on the corrected total weight. The credibility of the measured total weight declines as the weight of baggage in the cabin and/or the trunk of the vehicle increases. Accordingly, in the sixth embodiment, a mapping table corresponding to the detected total weight of passengers is used to generate a top-view image, and when white-line displacement exists, the total weight of passengers is corrected, and a mapping table to be used is determined based on the corrected total weight of passengers.

Figure 19:
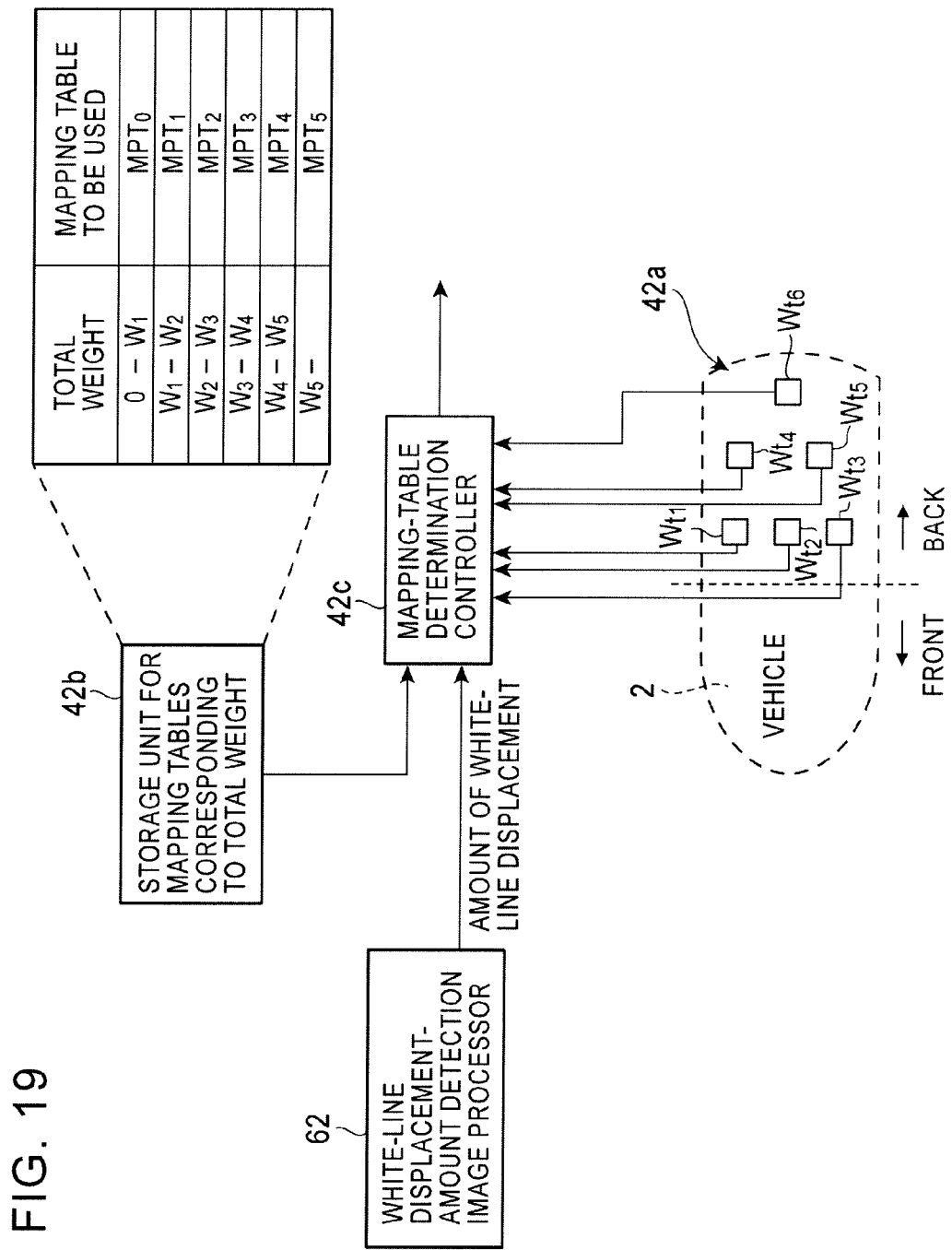
FIG. 19 is a diagram of the configuration of a use-mapping-table determining unit in the sixth embodiment.

FIG. 19 is a diagram of the use-mapping-table determining unit 42 in the sixth embodiment. The same units as those in the use-mapping-table determining unit of the first embodiment shown in FIG. 3 are denoted by the same reference numerals. The use-mapping-table determining unit 42 in the fifth embodiment is different from the one in the first embodiment in that the amount of white-line displacement detected by the white-line displacement-amount detection image processor 62 is sent to the mapping-table determination controller 42c.

When the vehicle is traveling straight at a speed of 30 km/h or more, the white-line displacement-amount detection image processor 62 detects an amount of white-line displacement at a connection of predetermined two image portions and sends a signal representing the detected amount of displacement to the mapping-table determination controller 42c. When no white-line displacement exists or the amount of displacement is less than or equal to a preset value, the mapping-table determination controller 42c determines that the measured total weight of passengers is correct. On the other hand, when white-line displacement exists, the mapping-table determination controller 42c corrects the total weight of passengers (i.e., increases or reduces the total weight of passengers by a predetermined amount) based on the direction of the white-line displacement, obtains the ID of the mapping table corresponding to the corrected total weight of passengers, and sends a notification indicating the ID to the mapping unit 26.

FIG. 20 is a control flow of the mapping-table determination controller 42c.

In step 301, the mapping-table determination controller 42c determines the total weight of passengers by adding up weights measured by the weight sensors. In step 302, the mapping-table determination controller 42c determines a mapping table to be used, based on the total weight of passengers. In step 303, the mapping-table determination controller 42c sends a notification indicating the determined mapping table to the mapping unit 26. The mapping unit 26 generates a top-view image by using the mapping table corresponding to the indicated total weight of passengers, and the white-line displacement-amount detection image processor 62 detects white-line displacement and sends a signal representing the detected amount of white-line displacement to the mapping-table determination controller 42c. In step 304, the mapping-table determination controller 42c checks whether or not the amount of white-line displacement is greater than or equal to a preset value. When the amount of white-line displacement is less than the present value, the mapping-table determination controller 42c determines that the detected total weight of passengers is correct and the processing ends. When the amount of white-line displacement is greater than or equal to the preset value, in step 305, the mapping-table determination controller 42c corrects the measured total weight of passengers based on the direction of the white-line displacement, and then performs the processing subsequent to step 302. With this arrangement, a mapping table to be used is determined based on the corrected total weight of passengers and the processing is repeated.

According to the sixth embodiment, the total weight of passengers is correctly determined, thus making it possible to reliably eliminate displacement at an image connection.

Although cases in which a top-view image is displayed have been described in the above embodiments, the present invention is applicable to cases in which images photographed by multiple cameras are combined and the resulting composite image is displayed.

What is claimed is:

1. An image display apparatus that captures surrounding images of a vehicle by using multiple cameras, combines the captured images to draw, in a frame memory, a composite image viewed from a viewpoint located above the vehicle, reads image data from the frame memory, and displays the composite image, the image display apparatus comprising:

image memories configured to store images of a first landscape located ahead of the vehicle, a second landscape located at a left side of the vehicle, a third landscape located at a right side of the vehicle, and a fourth landscape located behind the vehicle, each of the landscapes being photographed by respective cameras;

a detector configured to detect the number of passengers in seats exclusive of the vehicle front seats, the detector configured by embedding, in the seats, pressure-sensitive sensors configured to detect the seating of passengers;

a mapping memory configured to store a plurality of pre-determined mapping tables indicating relationships between pixel positions in the image memories and pixel positions in a frame memory, wherein each of the stored plurality of pre-determined mapping tables corresponds to one or both of a determined vehicle height and a vehicle tilt angle induced by a count of a number of passengers whose individual and total weight are detected by the sensor while in seats exclusive of vehicle front seats;

a mapping-table determining unit configured to determine which one of the plurality of predetermined mapping tables is to be used based upon the one or both of the determined vehicle height and vehicle tilt angle induced by the detected individual and total weight of the count of number of passengers while in seats exclusive of the vehicle front seats; and a mapping unit configured to:
   (1) read image data from the image memories by using the determined one of the plurality of predetermined mapping tables; and
   (2) map the read image data to the frame memory for display on a monitor.

2. The image display apparatus according to claim 1, further comprising an image processor configured to retrieve a composite image drawn in the frame memory and detect an amount of white-line displacement at a connection of image portions read from a predetermined two of the image memories, wherein the mapping-table determining unit corrects the count of number of passengers based on the amount of white-line displacement, and determines the mapping table to be used according to the corrected count of number of passengers.

3. The image display apparatus according to claim 1, wherein the mapping-table determining unit comprises:
- the detector configured to detect the number of passengers in the seats exclusive of the vehicle front seats;
- a storage unit configured to store the mapping table to be used that corresponds to a predetermined number of passengers; and
- a mapping-table determination controller configured to determine the mapping table to be used according to the count of number of passengers in the vehicle and send a notification indicating the determined mapping table to the mapping unit.

4. The image display apparatus according to claim 3, wherein the detector comprises a camera provided on the ceiling of the vehicle to photograph an image of the cabin of the vehicle and an image processor configured to perform image processing on the photographed image to detect the count of number of passengers.

5. The image display apparatus according to claim 3, wherein the detector comprises infrared sensors configured to detect the number of passengers.

\* \* \* \* \*